(12) United States Patent
Haim et al.

(10) Patent No.: US 8,873,443 B2
(45) Date of Patent: Oct. 28, 2014

(54) METHOD AND APPARATUS FOR POWER CONTROL FOR WIRELESS TRANSMISSIONS ON MULTIPLE COMPONENT CARRIERS ASSOCIATED WITH MULTIPLE TIMING ADVANCES

(71) Applicant: Interdigital Patent Holdings, Inc., Wilmington, DE (US)

(72) Inventors: John W. Haim, Baldwin, NY (US);
Janet A. Stern-Berkowitz, Little Neck, NY (US); Stephen E. Terry, Northport, NY (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 155 days.

(21) Appl. No.: 13/668,108

(22) Filed: Nov. 2, 2012

(65) Prior Publication Data

US 2013/0114505 A1       May 9, 2013

Related U.S. Application Data

(60) Provisional application No. 61/555,853, filed on Nov. 4, 2011, provisional application No. 61/591,050, filed (Continued)

(51) Int. Cl.
*G08C 17/00* (2006.01)
*H04W 52/14* (2009.01)

(Continued)

(52) U.S. Cl.
CPC .......... *H04W 52/146* (2013.01); *H04W 52/143* (2013.01); *H04W 52/04* (2013.01); *H04W 52/32* (2013.01); *H04W 52/30* (2013.01); *H04W 52/365* (2013.01); *H04W 52/367* (2013.01); *H04W 52/34* (2013.01)

USPC ........... 370/311; 370/328; 455/13.4; 455/522

(58) Field of Classification Search
CPC ... H04W 52/04; H04W 52/14; H04W 52/143; H04W 52/146; H04W 52/30; H04W 52/32
USPC .................................................. 370/311, 328
See application file for complete search history.

(56) References Cited

U.S. PATENT DOCUMENTS

2011/0268028 A1    11/2011   Stern-Berkowitz et al.
2013/0058315 A1*   3/2013    Feuersanger et al. ......... 370/336

(Continued)

FOREIGN PATENT DOCUMENTS

WO       10/091425        8/2010
WO       2010/091425      8/2010

OTHER PUBLICATIONS

Catt, "Considerations on UE-specific DM-RS configuration," 3GPP TSG RAN WG1 Meeting #67, R1-113732 (Nov. 14-18, 2011).

(Continued)

*Primary Examiner* — Farah Faroul
(74) *Attorney, Agent, or Firm* — Volpe and Koenig, P.C.

(57) ABSTRACT

A method and apparatus for power control for wireless transmissions on multiple component carriers associated with multiple timing advances are disclosed. A wireless transmit/receive unit (WTRU) may perform power scaling or other adjustments on physical channels in each subframe to be transmitted on component carriers that belong to different timing advance groups (TAGs) if a sum of the transmit powers of the channels would or is to exceed a configured maximum output power for that subframe where each TAG may be associated with a separate timing advance value for uplink transmissions. The WTRU may adjust the transmit power of at least one physical channel if a sum of transmit powers in an overlapping portion of subframes of a less advanced TAG and a more advanced TAG would or is to exceed a configured maximum WTRU output power during the overlap.

20 Claims, 16 Drawing Sheets

Related U.S. Application Data on Jan. 26, 2012, provisional application No. 61/612,096, filed on Mar. 16, 2012, provisional application No. 61/644,726, filed on May 9, 2012, provisional application No. 61/677,750, filed on Jul. 31, 2012, provisional application No. 61/705,436, filed on Sep. 25, 2012.

(51) Int. Cl.

| | |
|---|---|
| *H04W 52/34* | (2009.01) |
| *H04W 52/04* | (2009.01) |
| *H04W 52/32* | (2009.01) |
| *H04W 52/30* | (2009.01) |
| *H04W 52/36* | (2009.01) |

(56) References Cited

U.S. PATENT DOCUMENTS

| | | | | |
|---|---|---|---|---|
| 2013/0250925 | A1* | 9/2013 | Lohr et al. | 370/336 |
| 2014/0105141 | A1* | 4/2014 | Noh et al. | 370/329 |
| 2014/0119302 | A1* | 5/2014 | Ahn et al. | 370/329 |

OTHER PUBLICATIONS

Catt, "UL power control with multiple timing advances in Rel-11," 3GPP TSG RAN WG1 Meeting #68, R1-120093 (Feb. 6-10, 2012).
Ericsson et al., "P-MPR included in the upper limit of Pcmax," 3GPP TSG-RAN WG4 Meeting #61, R4-115680 (Nov. 14-18, 2011).
Ericsson et al., "Power scaling due to multiple TA values," 3GPP TSG-RAN WG1 #68, R1-120075 (Feb. 6-10, 2012).
ETSI MCC, "Report of 3GPP TSG RAN WG2 meeting #75," TSG-RAN Working Group 2 meeting #75bis, R2-115650 (Oct. 10-14, 2011).
Huawei et al., "RACH based multiple timing advances," 3GPP TSG RAN WG1 Meeting #67, R1-114093 (Nov. 14-18, 2011).
LG Electronics, "Aspect on Simultaneous Transmission of PRACH and UL Channels considering Multiple Timing Advance," 3GPP TSG RAN WG1 Meeting #67, R1-113910 (Nov. 14-18, 2011).
MCC Support, "Final Report of 3GPP TSG RAN WG1 #68 v1.0.0," 3GPP TSG RAN WG1 Meeting #68bis, R1-120951 (Mar. 26-30, 2012).
Motorola Mobility, "Support for Remote Radio Head operation," 3GPP TSG-RAN WG2#76, R2-116143 (Nov. 14-18, 2011).
Panasonic, "Simultaneous transmissions in multiple TA," 3GPP TSG-RAN WG1 Meeting #68, R1-120221 (Feb. 6-10, 2012).
Panasonic, "Uplink signalling for carrier aggregation enhancement," 3GPP TSG-RAN WG1 Meeting #66bis, R1-113115 (Oct. 10-14, 2011).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.3.0 (Sep. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.3.0 (Sep. 2011).
Third Generation Partnership Project, "Technical Specification Group Radio Access Network; Evolved Universal Terrestrial Radio Access (E-UTRA); Physical layer procedures (Release 10)," 3GPP TS 36.213 V10.7.0 (Sep. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.15.0 (Sep. 2011).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.19.0 (Sep. 2012).
Third Generation Partnership Project, "Technical Specification Group Radio Access Network; Evolved Universal Terrestrial Radio Access (E-UTRA); User Equipment (UE) radio transmission and reception (Release 9),"3GPP TS 36.101 V9.9.0 (Sep. 2011).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.13.0 (Sep. 2012).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.4.0 (Sep. 2011).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.8.0 (Sep. 2012).
Third Generation Partnership Project, "Technical Specification Group Radio Access Network; Evolved Universal Terrestrial Radio Access (E-UTRA); User Equipment (UE) radio transmission and reception (Release 11)," 3GPP TS 36.101 V11.2.0 (Sep. 2012).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.15.0 (Sep. 2011).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.19.0 (Sep. 2012).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.9.0 (Sep. 2011).
Third Generation Partnership Project, "Technical Specification Group Radio Access Network; Evolved Universal Terrestrial Radio

(56) References Cited

OTHER PUBLICATIONS

Access (E-UTRA); Requirements for support of radio resource management (Release 9)," 3GPP TS 36.133 V9.13.0 (Sep. 2012).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.4.0 (Sep. 2011).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.8.1 (Sep. 2012).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.2.0 (Sep. 2012).
Third Generation Partnership Project, "Technical Specification Group Radio Access Network; Evolved Universal Terrestrial Radio Access (E-UTRA); User Equipment (UE) conformance specification Radio transmission and reception Part 1: Conformance Testing; (Release 10)," 3GPP TS 36.521-1 V10.3.0 (Sep. 2012).
Third Generation Partnership Project, "Technical Specification Group Radio Access Network; Evolved Universal Terrestrial Radio Access (E-UTRA); User Equipment (UE) conformance specification; Radio transmission and reception; Part 1: Conformance Testing (Release 8)," 3GPP TS 36.521-1 V8.6.0 (Jun. 2010).
Third Generation Partnership Project, "Technical Specification Group Radio Access Network; Evolved Universal Terrestrial Radio Access (E-UTRA); User Equipment (UE) conformance specification; Radio transmission and reception; Part 1: Conformance Testing (Release 9)," 3GPP TS 36.521-1 V9.8.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.7.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.3.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.12.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.15.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.311 V8.17.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.8.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description, Stage 2 (Release 9)," 3GPP TS 36.300 V9.8.0 (Sep. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.5.0 (Sep. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.3.0 (Sep. 2012).
Third Generation Partnership Project, "Technical Specification Group Radio Access Network; Evolved Universal Terrestrial Radio Access (E-UTRA); Physical layer—Measurements (Release 8)," 3GPP TS 36.214 V8.7.0 (Sep. 2009).
Third Generation Partnership Project, "Technical Specification Group Radio Access Network; Evolved Universal Terrestrial Radio Access (E-UTRA); Physical layer; Measurements (Release 9)," 3GPP TS 36.214 V9.2.0 (Jun. 2010).
Third Generation Partnership Project, "Technical Specification Group Radio Access Network; Evolved Universal Terrestrial Radio Access (E-UTRA); Physical layer; Measurements (Release 10)," 3GPP TS 36.214 V10.1.0 (Mar. 2011).
Third Generation Partnership Project, "Technical Specification Group Radio Access Network; Evolved Universal Terrestrial Radio Access (E-UTRA) Physical layer; Measurements (Release 11)," 3GPP TS 36.214 V11.0.0 (Sep. 2012).
TSG RAN WG4, "Reply LS on simultaneous transmission of PUSCH/PUCCH/SRS for multiple TA," 3GPP TSG-RAN WG4 Meeting #62bis, R4-122226 (Mar. 26-30, 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description, Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.9.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.8.0 (Sep. 2011).
Third Generation Partnership Project, "Technical Specification Group Radio Access Network; Evolved Universal Terrestrial Radio Access (E-UTRA); Physical layer; Measurements (Release 9),"3GPP TS 36.214 V9.2.0 (Jun. 2010).
Third Generation Partnership Project, "Technical Specification Group Radio Access Network; Evolved Universal Terrestrial Radio Access (E-UTRA); Physical layer; Measurements (Release 11)," 3GPP TS 36.214 V11.0.0 (Sep. 2012).
Motorola Mobility, "Support for Remote Radio Head operation," 3GPP TSG-RAN WG2#75bis, R2-115368 (Oct. 10-14, 2011).
Panasonic, "Uplink Signaling for carrier aggregation enhancement," 3GPP TSG-RAN WG1 Meeting #66bis, R1-113115 (Oct. 10-14, 2011).

\* cited by examiner

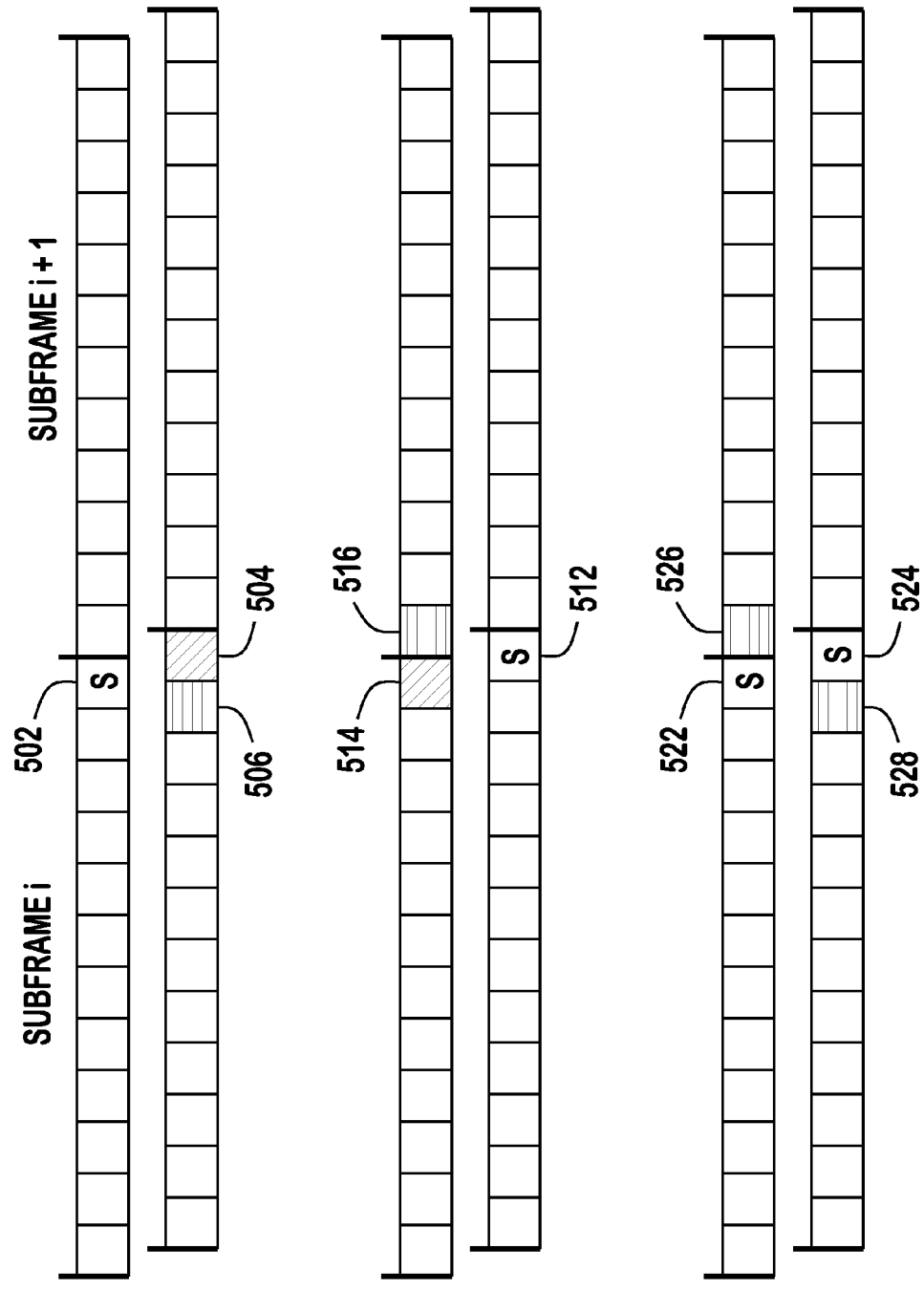

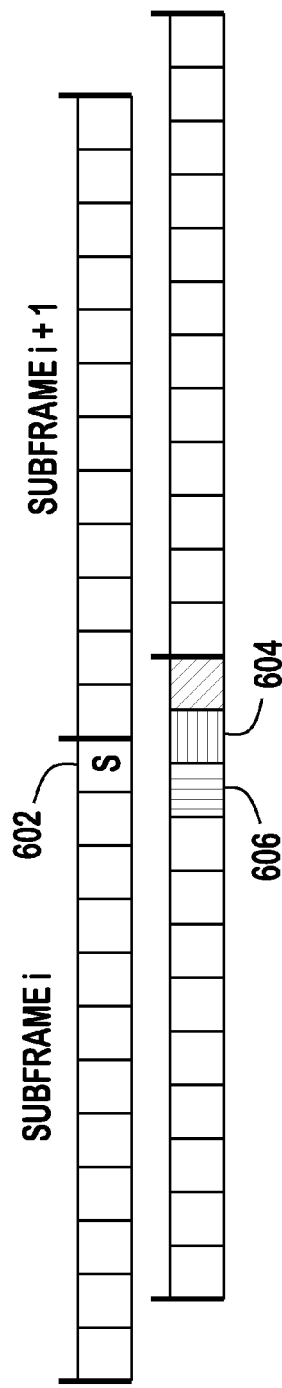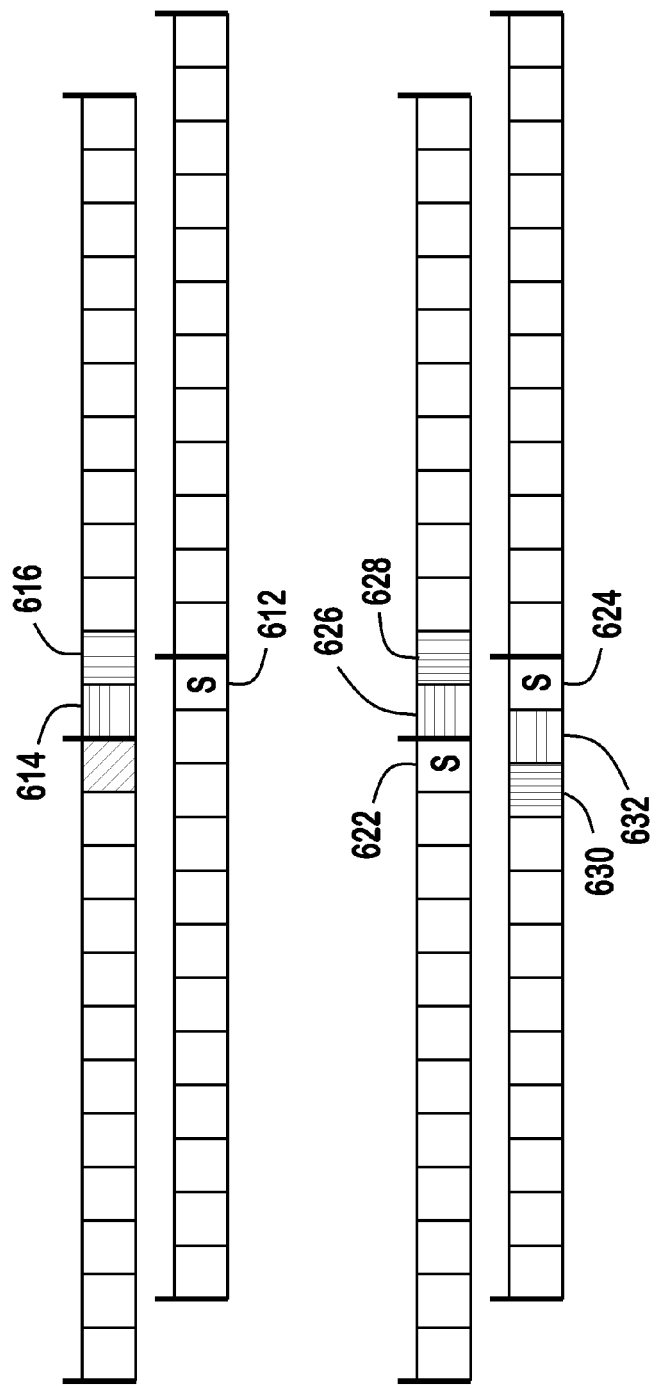
FIG. 6A
FIG. 6B
FIG. 6C

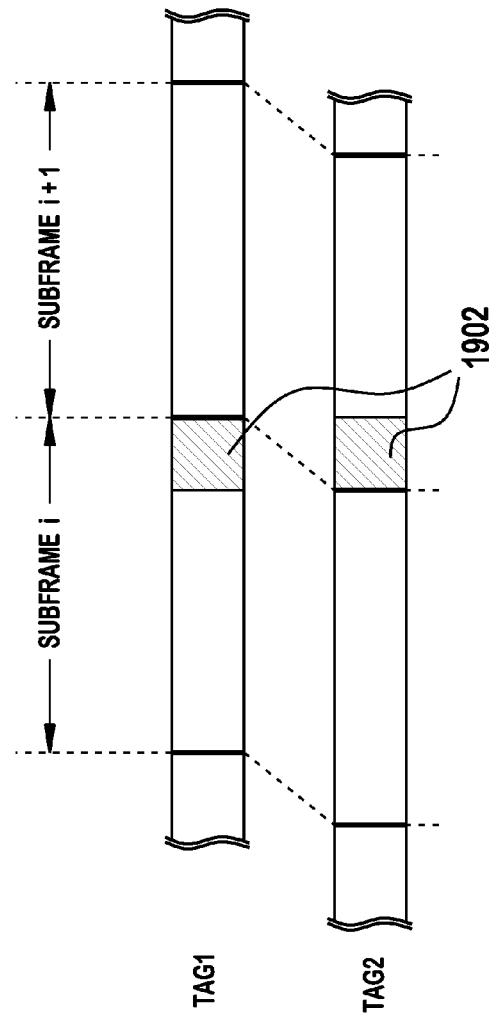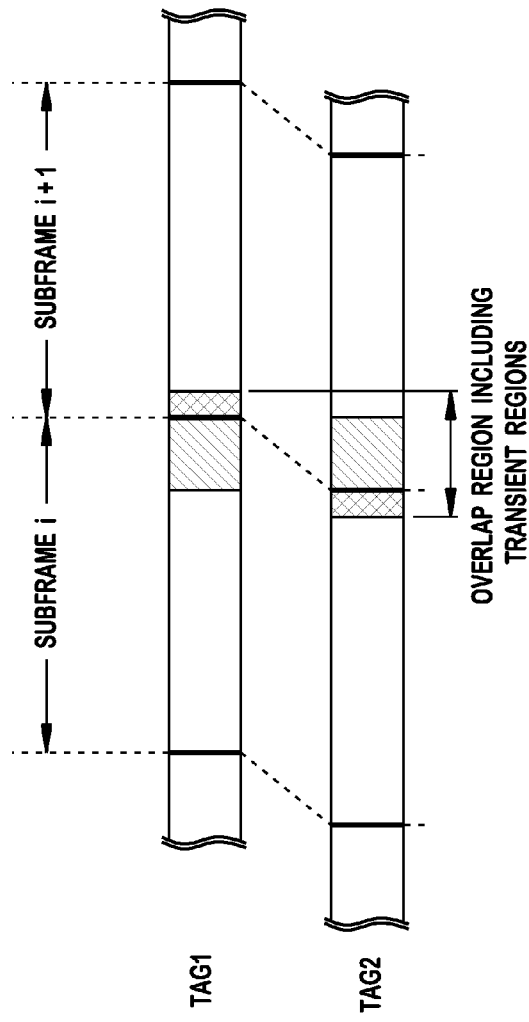

METHOD AND APPARATUS FOR POWER CONTROL FOR WIRELESS TRANSMISSIONS ON MULTIPLE COMPONENT CARRIERS ASSOCIATED WITH MULTIPLE TIMING ADVANCES

CROSS REFERENCE TO RELATED APPLICATIONS

This application claims the benefit of U.S. Provisional Application Nos. 61/555,853 filed Nov. 4, 2011, 61/591,050 filed Jan. 26, 2012, 61/612,096 filed Mar. 16, 2012, 61/644,726 filed May 9, 2012, 61/677,750 filed Jul. 31, 2012, and 61/705,436 filed Sep. 25, 2012, the contents of which are hereby incorporated by reference herein.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division-multiple access (CDMA) systems, time division multiple access (TDMA) systems, frequency division multiple access (FDMA) systems, Third Generation Partnership Project (3GPP) Long Term Evolution (LTE) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by 3GPP. It is designed to better support mobile broadband Internet access by improving spectral efficiency, lowering costs, improving services, making use of new spectrum, and better integrating with other open standards using OFDMA on the downlink (DL), single carrier frequency division multiple access (SC-FDMA) on the uplink (UL), and multiple-input multiple-output (MIMO) antenna technology.

Uplink transmitter power control in a mobile communication system balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells.

SUMMARY

A method and apparatus for power control for wireless transmissions on multiple component carriers associated with multiple timing advances are disclosed. A wireless transmit/receive unit (WTRU) may perform power scaling or other adjustments on physical channels in each subframe to be transmitted on component carriers that belong to different timing advance groups (TAGs) if a sum of the transmit powers of the channels would or is to exceed a configured maximum output power for that subframe where each TAG may be associated with a separate timing advance value for uplink transmissions. The WTRU may adjust the transmit power of at least one physical channel if a sum of transmit powers in an overlapping portion of subframes of a less advanced TAG and a more advanced TAG would or is to exceed a configured maximum WTRU output power during the overlap.

The WTRU may drop a sounding reference signal (SRS) on a condition that another physical channel is scheduled to be transmitted in an overlapping symbol on any component carrier. The WTRU may send a power headroom report to a network including a configured maximum WTRU output power for a present subframe on a condition that the configured maximum WTRU output power does not equal a configured maximum WTRU output power for any serving cell or a sum of configured maximum WTRU output powers for serving cells.

The WTRU may transmit a physical random access channel (PRACH) at a constant power level determined for a first subframe of the PRACH. A guard symbol may be included in a component carrier to avoid overlapping channels.

BRIEF DESCRIPTION OF THE DRAWINGS

A more detailed understanding may be had from the following description, given by way of example in conjunction with the accompanying drawings wherein:

FIGS. 5A-5C show examples of transmissions of SRS and other channels in case of less than one symbol TA difference between CCs;

FIGS. 6A-6C show examples of SRS and other channel transmissions in case of TA difference of more than one symbol;

FIG. 19 shows an example overlap region based on uplink (UL) timing; and

FIG. 20 shows an example overlap region including the transient regions.

DETAILED DESCRIPTION

Figure 1A:
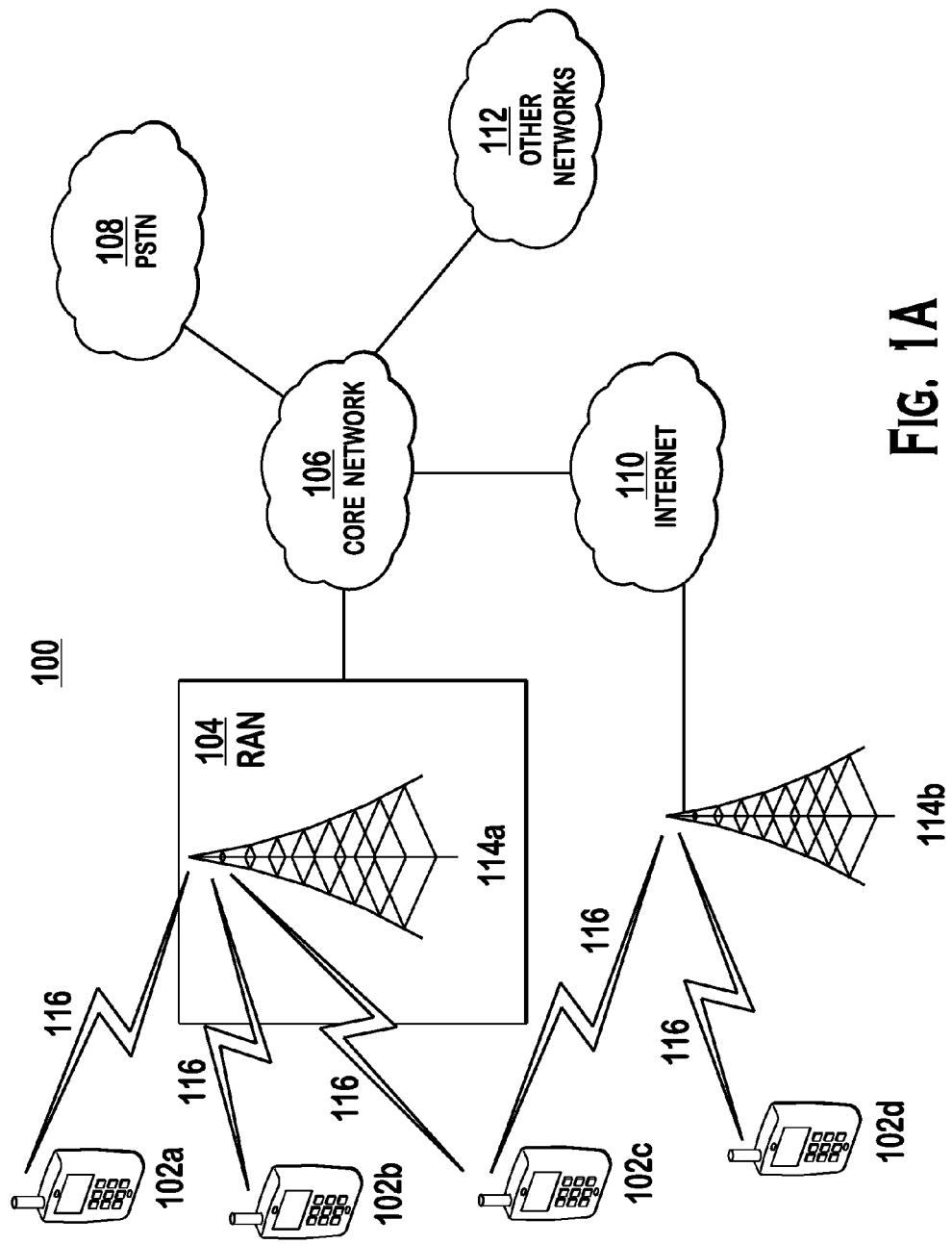
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
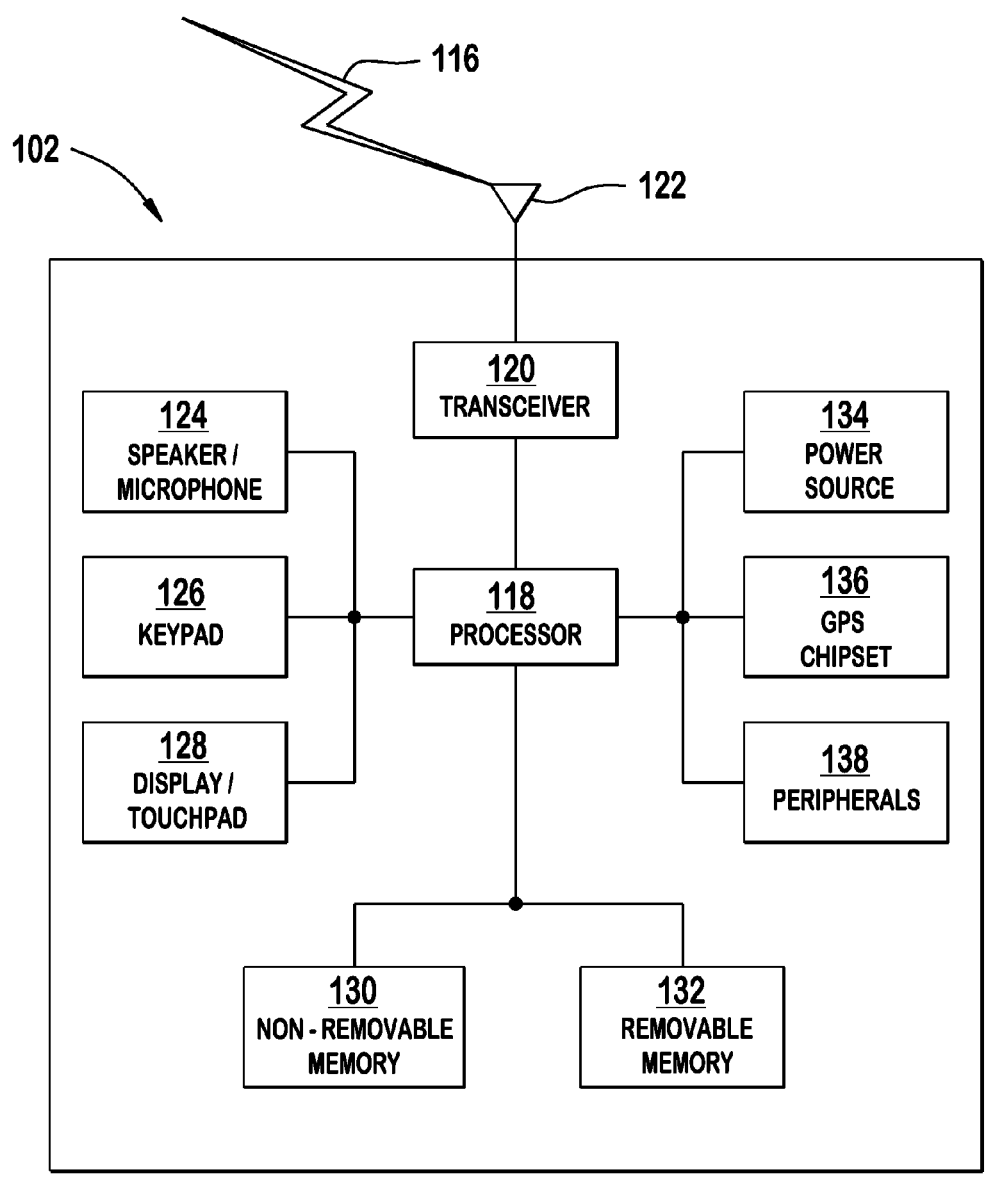
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
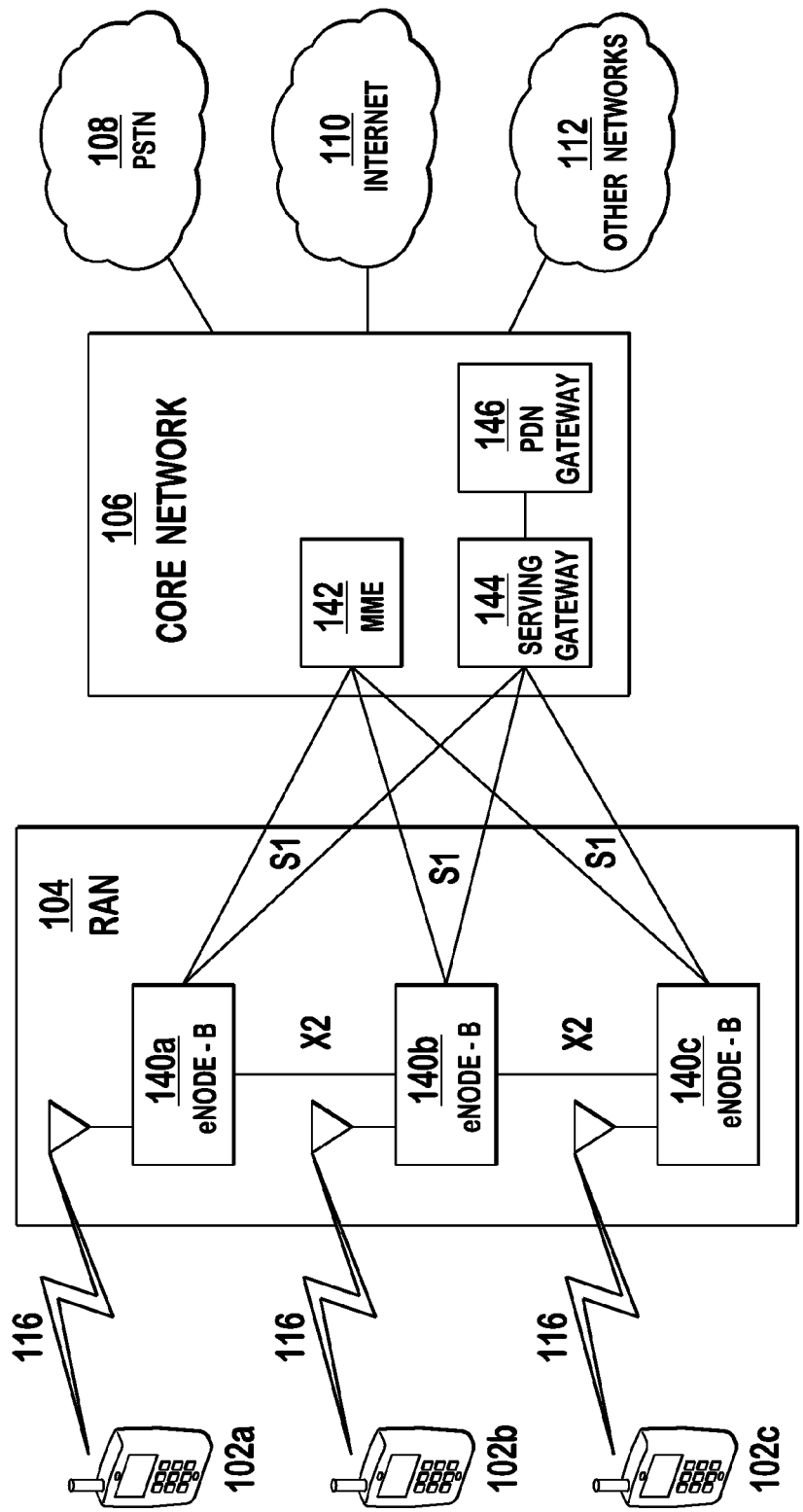
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In 3GPP LTE, for example according to LTE Release 8 (R8), a WTRU may transmit on one carrier to one cell which may be referred to as its serving cell. A WTRU supporting carrier aggregation, for example according to LTE Release 10 (R10), may transmit on multiple carriers simultaneously and may have multiple serving cells.

In some embodiments, a cell includes a combination of downlink and/or uplink resources. Each of the downlink and uplink resource sets may be associated to a carrier frequency, which may be the center frequency of the cell, and a bandwidth.

A WTRU supporting carrier aggregation, for example according to LTE R10, may be configured with one or more serving cells (or component carriers (CCs)) and for each CC the WTRU may be configured for UL communication. It is contemplated that the CC and the serving cell may be used interchangeably and still be consistent with the embodiments contained herein.

A WTRU supporting carrier aggregation may communicate with one primary cell (PCell) and one or more secondary cells (SCell). The terms cell and serving cell may be used interchangeably.

In the LTE, a WTRU UL transmission on a CC in any given subframe may contain at least one of a physical random access channel (PRACH), a physical uplink shared channel (PUSCH), or a physical uplink control channel (PUCCH). UL transmissions may be managed by subframe. For example, the transmission of a PUSCH and/or a PUCCH, each at some transmit power, in any given subframe may be managed separately from PUSCH and/or PUCCH transmissions in any other subframe. On a CC, PUSCH and PUCCH transmissions may use some set of subcarriers, for example as indicated by their respective grant or other configuration or allocation, and, with the possible exception of certain symbols, for example symbols in which the WTRU may transmit demodulation reference signals (DMRS) or symbols which may be used or reserved for a sounding reference signal (SRS), may use all of the symbols in the subframe. For example, for the normal cyclic prefix (CP) case, a PUSCH may be transmitted in 12 of the 14 symbols of the subframe, with DMRS in symbols 3 and 10, and a PUCCH may be transmitted in 8 of the 14 symbols, with DMRS in symbols 2-4 and 9-11.

In certain subframes, a WTRU may transmit an SRS. A WTRU may transmit an SRS periodically based on a schedule and transmission parameters which may be provided to the WTRU by the evolved NodeB (eNB), for example via one or more of broadcast signaling and radio resource control (RRC) dedicated signaling. Cell-specific SRS configuration may define the subframes in which the SRS is permitted to be transmitted by WTRUs for a given cell. WTRU-specific SRS configuration may define the subframes and the transmission parameters which may be used by a specific WTRU. In its WTRU-specific subframes, a WTRU may transmit an SRS in the last symbol across the entire frequency band of interest with a single SRS transmission, or across part of the band with hopping in the frequency domain in such a way that a sequence of SRS transmissions may jointly cover the frequency band of interest. A particular WTRU may transmit an SRS in WTRU-specific subframes which are a subset of the cell-specific SRS subframes. A WTRU may also transmit an SRS on demand in response to an aperiodic SRS request from the network which may be included in a downlink control information (DCI) format which may also provide an UL grant. Separate WTRU-specific SRS configurations may be provided to the WTRU for periodic and aperiodic SRS transmissions.

Certain rules may apply in cell-specific SRS subframes. In cell-specific SRS subframes of a particular CC in which a PUSCH is also scheduled for transmission by a certain WTRU on that CC, the certain WTRU may shorten the PUSCH transmission (e.g., the certain WTRU may not map a PUSCH to or transmit a PUSCH in the last symbol of the subframe) if the PUSCH transmission partly or fully overlaps with the cell-specific SRS bandwidth. If there is no overlap, the certain WTRU may not shorten the PUSCH transmission. In either case, the certain WTRU may transmit the PUSCH in the subframe, and if this is a WTRU-specific SRS subframe for the certain WTRU, the certain WTRU may also transmit an SRS in the subframe where the PUSCH and the SRS may be transmitted in their respective symbols in the subframe.

In cell-specific SRS subframes of a particular CC in which a certain PUCCH format, for example PUCCH format 1, 1a, 1b, or 3, is also scheduled for transmission by a certain WTRU on that CC and a parameter, for example ackNack-SRS-SimultaneousTransmission, is a certain value such as TRUE for at least the certain WTRU, the certain WTRU may use a shortened PUCCH format which does not use the last symbol of the subframe (e.g., the certain WTRU may not map a PUCCH to or transmit PUCCH in the last symbol of the subframe). The certain WTRU may transmit a PUCCH in the subframe, and if this is a WTRU-specific SRS subframe for the certain WTRU, the certain WTRU may also transmit an SRS in the subframe where the PUCCH and the SRS may be transmitted in their respective symbols in the subframe. If another PUCCH format is scheduled for transmission or the parameter, e.g., ackNackSRS-SimultaneousTransmission, is a certain other value such as FALSE for at least the certain WTRU, the certain WTRU may transmit a PUCCH using the regular (e.g., non-shortened) format and may drop (e.g., may not transmit) the SRS.

A WTRU may synchronize its reception and transmission timing to the received frame timing of a reference cell. With carrier aggregation (CA), the reference cell may be a primary cell (PCell) or a secondary cell (SCell). The timing of received frame boundaries may vary over time due to WTRU motion and/or other factors, (e.g., oscillator drift), and a WTRU may autonomously adjust its timing accordingly. In addition, the WTRU may apply a timing advance (TA) to the transmitted signals, (e.g., the WTRU may start transmission of a given UL subframe some amount of time, (e.g., the applied TA), before the start of the corresponding DL subframe. The eNB may provide TA commands to each WTRU which may communicate with it in the UL or which may be under its control, and the eNB may provide such commands with the intent that UL transmissions from the WTRUs in any given subframe intended for a certain cell arrive at the certain cell at nominally the same time. The WTRU may also autonomously adjust its uplink timing according to the received downlink frame of the reference cell, and that timing may change.

The term "timing advance group" (TAG) includes, without loss of generality, a group of one or more serving cells, which may be configured by higher layer signaling such as RRC signaling, for which a WTRU may for each cell in the group apply the same TA value or offset, for example, using a downlink timing reference for each cell which reference may or may not be the same for all cells of a group. Application of TA may be limited to cells with configured uplink. The TAG may be limited to cells with configured uplink. The primary TAG (pTAG) may be the TAG that contains the PCell. The pTAG may or may not contain SCells. A secondary TAG (sTAG) may be a TAG that does not contain the PCell. An sTAG may contain SCells only and may contain at least one cell with configured uplink.

A WTRU configured for CA may transmit on more than one serving cell in the same subframe. The terms "serving cell" and "CC" may be used interchangeably. In certain cases, such as intra-band CA (e.g., the aggregated CCs are in the same band), the WTRU may use the same DL timing reference and the same timing advance for the aggregated CCs and as a result, the WTRU may transmit subframes in the aggregated CCs time aligned (e.g., exactly or almost exactly time aligned) with each other.

TA and ΔTA may be replaced by UL timing and UL timing difference, respectively in any of the embodiments disclosed hereafter. The terms "subframe" and "transmission time interval" (TTI) may be used interchangeably. Subframes i and i+1 may represent consecutive subframes which may overlap in time and N and N+1 may be used instead of i and i+1. The terms "power backoff" and "power reduction" may be used interchangeably. Italicized and non-italicized notations may be used interchangeably.

For each subframe in which a WTRU may transmit, the WTRU may set the transmit power of the physical channels to be transmitted. The WTRU may determine a PUSCH, a PUCCH, and/or an SRS transmit power in accordance with at least one of the following:

$$P_{PUSCH,c}(i) = \min\left\{ \begin{array}{c} P_{CMAX,c}(i), \\ 10\log_{10}(M_{PUSCH,c}(i)) + P_{O\_PUSCH,c}(j) \cdot PL_c + \Delta_{TF,c}(i) + f_c(i) \end{array} \right\};$$ Equation (1)

or, $$P_{PUSCH,c}(i) = \min\left\{ \begin{array}{c} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\};$$ Equation (2)

$$P_{PUCCH,c}(i) = \min\left\{ \begin{array}{c} P_{CMAX,c}(i), \\ P_{0\_PUCCH} + PL_c + h(n_{CQI}, n_{HARQ}, n_{SR}) + \Delta_{F\_PUCCH}(F) + \Delta_{T \times D}(F') + g(i) \end{array} \right\};$$ Equation (3)

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}.$$ Equation (4)

$P_{PUSCH,c}(i)$ and $P_{SRS,c}(i)$ may be the power of a PUSCH and an SRS, respectively, for CC c in subframe i, $P_{PUCCH}(i)$ may be the power of a PUCCH in subframe i, and $P_{CMAX,c}(i)$ may be the configured maximum output power for CC c in subframe i and each of these values may be in dBm. $\hat{P}_{PUCCH}(i)$ may be the linear value of $P_{PUCCH}(i)$ $\hat{P}_{PUSCH,c}(i)$ may be the linear value of $P_{PUSCH,c}(i)$, and $\hat{P}_{CMAX,c}(i)$ may be the linear value of $P_{CMAX,c}(i)$. The WTRU may set $P_{CMAX,c}(i)$ within allowed limits.

$M_{PUSCH,c}(i)$ may be the bandwidth of the PUSCH resource assignment and may be expressed in number of resource blocks valid for subframe i and serving cell c.

$P_{O\_PUSCH,c}(j)$ may be a parameter composed of the sum of a component $P_{O\_NOMINAL\_PUSCH,c}(i)$ which may be provided by higher layers for j=0 and 1 and a component $P_{O\_UE\_PUSCH,c}(j)$ which may be provided by higher layers for j=0 and 1 for serving cell c. For PUSCH (re)transmissions corresponding to a semi-persistent grant j may be 0, for PUSCH (re)transmissions corresponding to a dynamic scheduled grant j may be 1 and for PUSCH (re)transmissions corresponding to the random access response grant j may be 2. For j=2, the value of $P_{O\_NOMINAL\_PUSCH,c}(j)$ may be set based on a random access procedure results and $P_{O\_UE\_PUSCH,c}(j)$ may be 0. $\alpha_c(j)$ may be a parameter provided by higher layers or may be a fixed value. $PL_c$ may be a downlink pathloss estimate calculated in the WTRU for serving cell c. $\Delta_{TF,c}(i)$ may be a parameter computed by the WTRU based on parameters provided by higher layers and/or one or more of the number of code blocks, size if each code block, the number of channel quality indicator (CQI)/precoding matrix indicator (PMI) bits to be transmitted, and the number of resource elements. $f_c(i)$ may be a power control accumulation term which may be an accumulation of transmit power control (TPC) commands, for example for PUSCH on CC c.

$P_{O\_PUCCH}$ may be a parameter composed of the sum of a parameter $P_{O\_NOMINAL\_PUCCH}$ which may be provided by higher layers and a parameter $P_{O\_UE\_PUCCH}$ which may be provided by higher layers. $h(n_{CQI}, n_{HARQ}, n_{SR})$ may be a PUCCH format dependent value which may be a function of the number of CQI, hybrid automatic repeat request (HARQ), and Scheduling Request bits to be transmitted. The parameter $\Delta_{F\_PUCCH}(F)$ may be a PUCCH format dependent parameter which may be provided by higher layers. $\Delta_{T \times D}(F')$ may be a PUCCH format dependent parameter which may be provided by higher layers if the WTRU is configured by higher layers to transmit PUCCH on two antenna ports and may be 0 otherwise. g(i) may be a power control accumulation term which may be an accumulation of TPC commands, for example for PUCCH.

$P_{SRS\_OFFSET,c}(m)$ may be a parameter provided by higher layers and m may have a value which represents the SRS mode which may be periodic or aperiodic. $M_{SRS,c}$ may be the bandwidth of the SRS transmission in subframe i for serving cell c and may be expressed in number of resource blocks. The parameters in the SRS equation which have the same notation as in the PUSCH equations may use the same values as those used for the PUSCH power for the same CC c.

The WTRU may determine, (e.g., first determine), the power of each channel to be transmitted. If the sum of the channel transmit powers, (e.g., the determined channel transmit powers), would or is to exceed the configured maximum output power, (e.g., the total configured maximum output power), of the WTRU, the WTRU may scale the transmit power of the channels, such as per a set of rules, such that after the scaling, the sum of the transmit powers would not or does not exceed the configured maximum output power, (e.g., the total configured maximum output power), of the WTRU, $P_{CMAX}$.

For example, the WTRU may scale $\hat{P}_{PUSCH,c}(i)$ for serving cell c in subframe i such that the following condition is met:

$$\sum_c w(i) \cdot \hat{P}_{PUSCH,c}(i) \le (\hat{P}_{CMAX}(i) - \hat{P}_{PUCCH}(i)). \quad \text{Equation (5)}$$

$\hat{P}_{PUCCH}(i)$ may be the linear value of $P_{PUCCH}(i)$, $\hat{P}_{PUSCH,c}(i)$ may be the linear value of $P_{PUSCH,c}(i)$, $\hat{P}_{CMAX}(i)$ may be the linear value of the WTRU total configured maximum output power $P_{CMAX}$ in subframe i, and w(i) may be a scaling factor of $\hat{P}_{PUSCH,c}(i)$ for serving cell c where $0 \le w(i) \le 1$.

Scaling, or otherwise adjusting, transmit power may follow a set of rules which may be based on channel priority. For example, the priorities may be, from the highest to the lowest: a PUCCH, a PUSCH with uplink control information (UCI), and a PUSCH without UCI and a higher priority channel may use all of the available transmit power, and the next lower priority channel may use any remaining available transmit power. When there are multiple channels of the same priority, if there is not enough power for all of them, power may be shared equally amongst them such that the same relative power reduction is applied to each channel. Once a power reduction is applied to a channel or group of channels, if no power is available to the next lower priority channel, those lower priority channels may not be transmitted.

A WTRU may scale an SRS transmit power if the sum of SRS transmit powers in more than one CC would or is to exceed the total configured maximum output power of the WTRU, for example:

$$\sum_c w(i) \cdot \hat{P}_{SRS,c}(i) \le \hat{P}_{CMAX}(i). \quad \text{Equation (6)}$$

$\hat{P}_{SRS,c}(i)$ may be the linear value of $P_{SRS,c}(i)$.

The WTRU may determine (or set) the configured maximum WTRU output power for serving cell c, $P_{CMAX,c}$, within a lower and upper bound as follows:

$$P_{CMAX\_L,c} \le P_{CMAX,c} \le P_{CMAX\_H,c}; \quad \text{Equation (7)}$$

The lower and upper bound may, for example be defined as:

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, P\text{-}MPR_c) - \Delta T_{C,c}\}; \text{ and} \quad \text{Equation (8)}$$

$$P_{CMAX\_H,c} = \text{MIN}\{P_{EMAX,c}, P_{PowerClass}\}. \quad \text{Equation (9)}$$

$P_{EMAX,c}$ may be the maximum allowed WTRU output power which may be signaled by higher layers for the serving cell c, $P_{PowerClass}$ may be the maximum WTRU power, for example according to its power class, and may not take tolerance into account, maximum power reduction (MPRs), additional maximum power reduction (A-MPR$_c$), power management power reduction (P-MPRs), $\Delta T_{C,c}$, and $\Delta T_{IB,c}$ may be terms for the serving cell c that allow the WTRU to reduce its maximum output power for certain permitted reasons such as to meet emissions requirements and specific absorption requirements (SAR), among others. These values may be in dB.

For carrier aggregation with UL serving cells, the WTRU may determine (or set) the total configured maximum WTRU output power $P_{CMAX}$ within a lower and upper bound as follows:

$$P_{CMAX\_L\_CA} \le P_{CMAX} \le P_{CMAX\_H\_CA}; \quad \text{Equation (10)}$$

The lower and upper bound may, for example, be defined for inter-band carrier aggregation as follows:

$$P_{CMAX\_L\_CA} = \text{MIN}\{10 \log_{10} \Sigma \text{MIN}[p_{EMAX,c}/(\Delta t_{C,c}), p_{PowerClass}/(mpr_c \cdot a\text{-}mpr_c \cdot \Delta t_{C,c} \cdot \Delta t_{IB,c}), p_{PowerClass}/(pmpr_c \cdot \Delta t_{C,c})], P_{PowerClass}\}; \text{ and} \quad \text{Equation (11)}$$

$$P_{CMAX\_H\_CA} = \text{MIN}\{10 \log_{10} \Sigma p_{EMAX,c}, P_{PowerClass}\}. \quad \text{Equation (12)}$$

$p_{EMAX,c}$ may be the linear value of $P_{EMAX,c}$, $\Delta t_{C,c}$ may be the linear value of $\Delta T_{C,c}$, $p_{PowerClass}$ may be the linear value of $P_{PowerClass}$, and mprc, a-mprc and pmprc may be the linear values of MPRc, A-MPRc and P-MPRc, respectively.

In some embodiments $P_{CMAX}$ may be equivalent to $P_{CMAX}$(i) and the terms may be used interchangeably.

The measured maximum output power $P_{UMAX}$ over serving cells may be defined or required to be within the following range:

$$P_{CMAX\_L\_CA} - T(P_{CMAX\_L\_CA}) \leq P_{UMAX} \leq P_{CMAX\_H\_CA} + T(P_{CMAX\_H\_CA}); \quad \text{Equation (13)}$$

$$P_{UMAX} = 10 \log_{10} \Sigma p_{UMAX,c}. \quad \text{Equation (14)}$$

T(P) may be an allowed tolerance that is a function of the value of P and $p_{UMAX,c}$ may denote the measured maximum output power for serving cell c expressed in linear scale.

Figure 2:
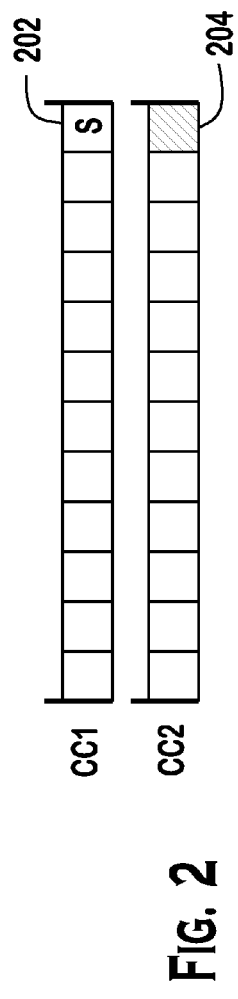
FIG. 2 shows an example subframe which is a cell-specific SRS subframe in one component carrier (CC) but not another.

When a WTRU is transmitting on multiple CCs, certain rules may apply governing the transmission of SRS in one CC based on what may be transmitted in another CC. For example, a subframe may be a cell-specific SRS subframe in one CC but not another. FIG. 2 shows an example in which a subframe is a cell-specific SRS subframe of one CC, CC1, but not another, CC2.

According to an example set of rules, such as those defined for LTE R10, if the WTRU is scheduled to transmit an SRS in one CC, (e.g., CC1), and the WTRU is also scheduled to transmit a PUSCH or a PUCCH (with possible exceptions which may be format dependent) where such transmission includes transmission in the last symbol 204 in another CC, (e.g., CC2), the WTRU may drop (e.g., may not transmit) the scheduled SRS in CC1. If the WTRU is not scheduled to transmit a PUSCH or a PUCCH in CC2 or the WTRU is scheduled to transmit a PUSCH or a PUCCH in CC2 but such transmission does not include transmission in the last symbol 204 of CC2 (e.g., because this is a cell-specific SRS subframe for CC2), the WTRU may transmit a scheduled SRS 202 in CC1. The rules regarding PUCCH may be dependent on the PUCCH format to be transmitted, for example, SRS transmission may have priority over PUCCH transmission for certain PUCCH formats such as PUCCH format 2 without HARQ-ACK.

A WTRU transmitting on multiple CCs may have a different DL timing reference and/or a different TA for one or more of those CCs. A timing advance group (TAG) may be a set of CCs for which the WTRU has a common DL timing reference and/or a common TA.

Figure 3:
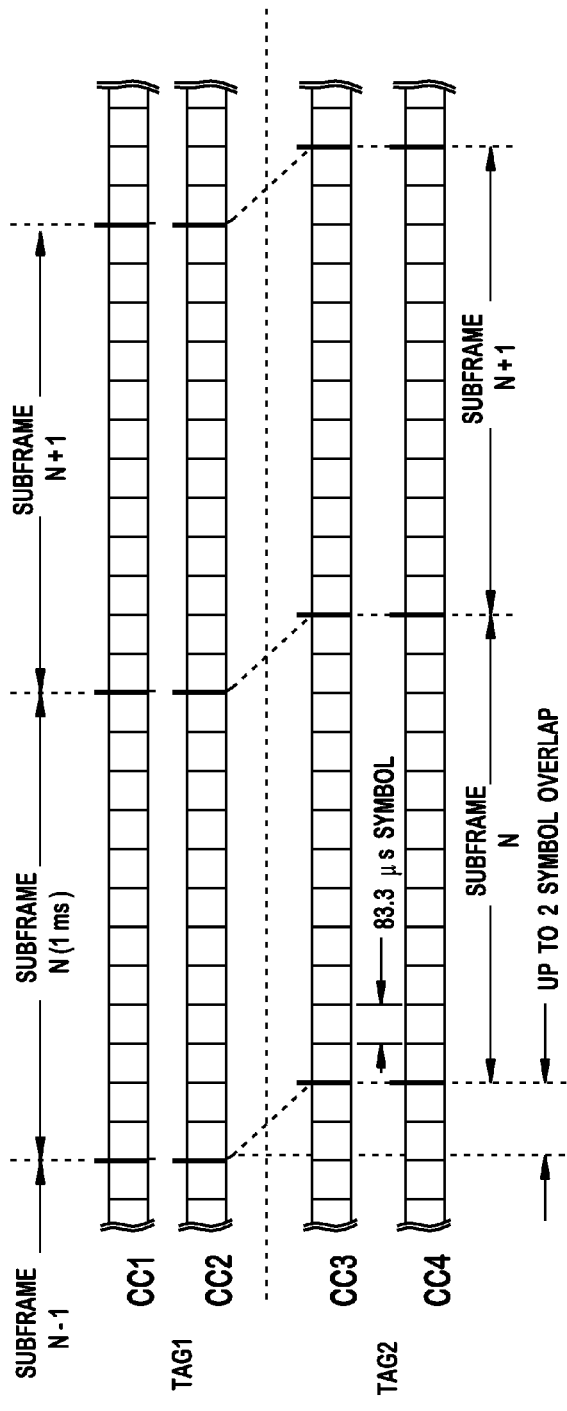
FIG. 3 shows an example of multiple timing advance groups (TAGs) with a different timing advance (TA) applied to each TAG.

Given CCs using a different DL timing reference and/or a different TA, if the WTRU transmits on two or more such CCs nominally at the same time, (i.e., nominally in the same subframe), the subframe and internal symbol boundaries may not be time-aligned with each other, resulting in subframes and their internal symbols in one CC overlapping with those in one or more other CCs. FIG. 3 shows an example of multiple TAGs with a different TA applied to each TAG. TAG1 is more advanced than TAG2 in FIG. 3. It should be noted that the example in FIG. 3 shows two CCs in each of two TAGs, but there may be any number of TAGs with any number of CCs in each TAG. It should also be noted that the example in FIG. 3 shows a time difference that may result in overlap of up to 2 symbols, but this is for example purposes and the time difference and overlap may be any value.

Conventionally, transmit powers of UL channels, (e.g., $P_{PUSCH,c}$(i), $P_{PUCCH}$(i), $P_{SRS,c}$(i), and $P_{PRACH}$(i) or $P_{PRACH,c}$(i)), are determined with no consideration to an UL timing difference between CCs. However, when there is an UL timing difference between CCs, such transmit powers may need to be determined differently, for example to prevent the WTRU from exceeding maximum transmit power and/or causing excessive interference at maximum transmit power when subframes of one CC may overlap adjacent subframes of another CC.

A WTRU may receive uplink scheduling grants in the DL that direct the WTRU's UL transmissions. Uplink scheduling grants received in one subframe, (e.g., subframe n), may yield UL transmissions in a later subframe, (e.g., subframe n+4, for example for LTE FDD). A WTRU may process a grant for one UL subframe at a time. In this example, for any given subframe n+4 for which an UL scheduling grant has been received in subframe n, at some point in time during the interval [n,n+4], the WTRU may demodulate and decode the grant and perform the power processing for subframe n+4. The power processing may include one or more of: determination of the various channels' transmit powers for subframe n+4, determination of scaling to not exceed WTRU total configured maximum output power, deciding to transmit or not transmit a scheduled SRS, puncturing a PUSCH and/or shortening a PUCCH to accommodate an SRS, and the like.

Hereafter, one subframe, such as subframe n+4, is referred to as a "present" subframe, the previous subframe is referred to as a "past" subframe" and the next subframe is referred to as a "future" subframe. Decisions about a subframe such as a present subframe may be made, and in a practical WTRU implementation may typically be made, during some subframe prior to the present subframe. Determination of power for a present subframe may be impacted by transmissions in a past or future subframe. In an example WTRU implementation, transmissions (e.g., power for transmissions) in a past subframe may not be changed to accommodate transmissions in a later (present) subframe, for example because the past has already occurred and may not be able to be changed. In another example, transmissions (e.g., power for transmissions) in a present subframe may not be changed to accommodate transmissions in a future subframe, for example because when the WTRU is making decisions about the present subframe, it may not yet have full knowledge of transmissions for the future subframe.

It should be noted that the above timing relationship of UL assignment in subframe n and UL transmission in subframe n+4 is provided as an example and the embodiments disclosed herein are applicable to any timing relationship such as one which may correspond to any standard (e.g., LTE FDD or LTE TDD). In addition, use of subframe n+4 as a present subframe is for example purposes and any subframe may be considered a present subframe with a subframe preceding it being a past subframe and a subframe after it being a future subframe and still be consistent with the embodiments disclosed herein. In some embodiments i or N may be used to represent the present subframe with i−1 or N−1 representing the past subframe and/or i+1 or N+1 representing the future subframe. Other notation may be used and still be consistent with the embodiments disclosed herein.

Conventionally, the rules for simultaneous transmission of an SRS and other channels by a given WTRU on different CCs are typically predicated on the UL subframe boundaries of the CCs coinciding (e.g., exactly or nearly exactly coinciding), for example, assuming that there is no overlap (e.g., adjacent subframe overlap) due to TA difference or no TA difference among CCs. When there is a TA difference, the conventional rules may not properly handle simultaneous SRS and other UL transmissions. For example, in case of no TA difference, a WTRU may be allowed to transmit an SRS in one CC simultaneously with a shortened PUSCH in another CC. However, when there is a TA difference, applying that rule may result in transmission of a PUSCH in one CC and an SRS in another CC occurring within the same symbol period. This is referred to as cross-subframe conflicts (between past, present, and future subframes) between an SRS and other channels.

Figure 4A:
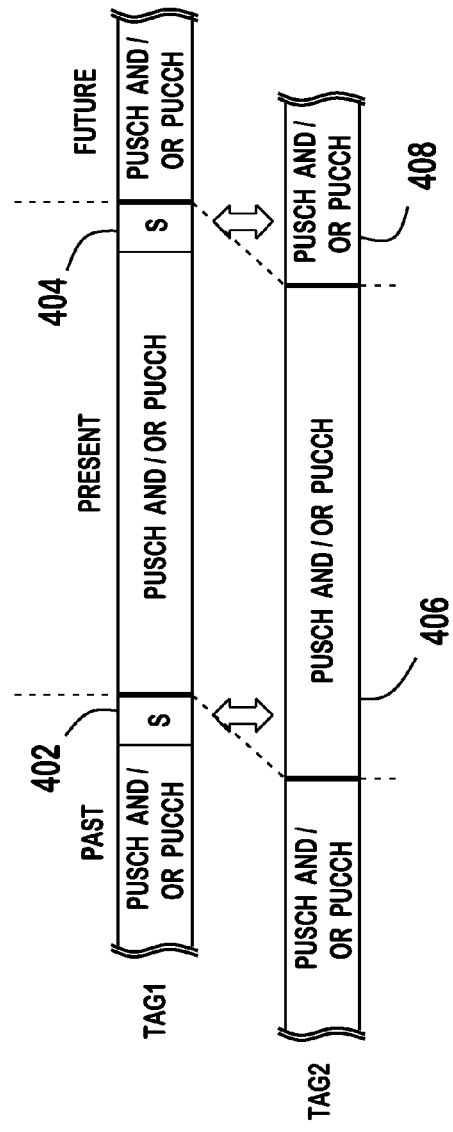
FIGS. 4A and 4B show examples of cross-subframe conflicts between SRS and other channel transmissions.
Figure 4B:
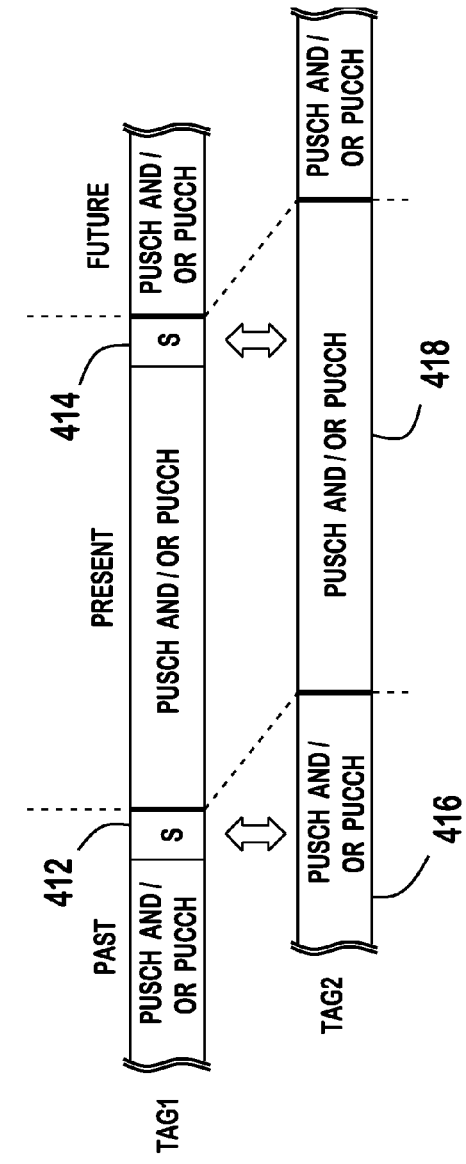

FIGS. 4A and 4B show examples of cross-subframe conflicts between an SRS and other channel transmissions. In case where an SRS is transmitted in a less advanced TAG as shown in FIG. 4A, an SRS 402 in the past subframe may conflict with a PUSCH and/or PUCCH 406 in the present subframe, and a PUSCH and/or PUCCH 408 in the future subframe may conflict with an SRS 404 in the present subframe. In case where an SRS is transmitted in a more advanced TAG as shown in FIG. 4B, an SRS 412 in the past subframe may conflict with a PUSCH and/or PUCCH 416 in the past subframe, and a PUSCH and/or PUCCH 418 in the present subframe may conflict with an SRS 414 in the present subframe.

Embodiments for handling an SRS and other UL channels that are scheduled for simultaneous transmission in case of UL timing difference are disclosed hereafter.

In one embodiment, a WTRU may not transmit an SRS simultaneously with a PUSCH and/or a PUCCH in the same symbol, and this may extend to adjacent symbols or adjacent subframes. FIGS. 5A-5C show examples of transmissions of an SRS and other channels in case of less than one symbol TA difference between CCs. In these examples, the SRS is transmitted at the end of a subframe. In FIGS. 5A-5C, the horizontally crosshatched symbol is an additional symbol (either in the current or next subframe) that may be affected by the rules for simultaneous SRS and other UL channel transmissions in case of UL timing difference between CCs.

In FIG. 5A, an SRS 502 is scheduled in a more advanced CC. The WTRU may transmit the scheduled SRS 502 for a given CC in subframe i if a PUSCH or a PUCCH is not mapped to both the last symbol 504 and the next to last symbol 506 of another CC (less advanced CC) in subframe i. The WTRU may drop the scheduled SRS 502 for a given CC in subframe i if a PUSCH or a PUCCH is mapped to the last symbol 504 or the next to last symbol 506 of another CC (less advanced CC) in subframe i. For example, the WTRU may drop the scheduled SRS 502 if the WTRU uses a shortened PUCCH format or a shortened PUSCH on another CC (less advanced CC) that does not use the last symbol 504 of subframe i but uses the next to last symbol 506 on that CC.

In FIG. 5B, an SRS is scheduled in a less advanced CC. In this case, a cross-subframe interference may occur between an SRS in a present subframe and other channels in a future subframe, or between an SRS in a past subframe and other channels in a present subframe. The WTRU may transmit the scheduled SRS 512 for a given CC in subframe i if a PUSCH or a PUCCH is not mapped to both the last symbol 514 in subframe i and the first symbol 516 in subframe i+1 of another CC (more advanced CC). The WTRU may drop a scheduled SRS 512 for a given CC in subframe i if a PUSCH or a PUCCH is mapped to the last symbol 514 in subframe i or the first symbol 516 in subframe i+1 of another CC (more advanced CC). This may be practical implementation, because the SRS is at the end of its subframe and the WTRU may later (up until the point in time of actual SRS transmission) decide to not transmit SRS in the present subframe as it originally had determined to do so as part of the processing for the present subframe. In case the WTRU decides not to transmit the SRS, the WTRU may undo any PUSCH puncturing or PUCCH shortening as the WTRU originally determined to do so as part of the processing for the present subframe.

In FIG. 5C, SRSs 522, 524 are scheduled in both CCs. In this case, a cross-subframe interference may occur between an SRS in a present subframe and other channels in a future subframe, or between an SRS in a past subframe and other channels in a present subframe. A WTRU may transmit SRS 522, 524 scheduled simultaneously on 2 CCs if the WTRU does not use (e.g., a PUSCH and a PUCCH are not mapped to) the next to last symbol 528 in the current subframe (subframe i) of the less advanced CC and the WTRU does not use (e.g., a PUSCH and a PUCCH are not mapped to) the first symbol 526 in the next subframe (subframe i+1) of the more advanced CC.

In FIGS. 5A-5C, two CCs are used just as an example and the embodiments are applicable to the case where more than two CCs are active for the WTRU. In that case, the WTRU may determine whether to transmit an SRS based on the scheduled transmissions and UL timing relationships of more than one other CC.

In another embodiment, a WTRU may avoid using the additional symbols (horizontally crosshatched symbols 506, 516, 526, 528 in FIGS. 5A-5C) to allow the scheduled SRSs to be transmitted. The WTRU may avoid the diagonally crosshatched symbols 504, 516 in FIGS. 5A-5C to allow the scheduled SRS to be transmitted in the same CC as is the PUSCH or PUCCH.

In another embodiment, additional transmission formats may be defined. For example, a shortened PUSCH and/or PUCCH format that does not use the last 2 symbols in the subframe, a shortened PUSCH and/or PUCCH format that does not use the first symbol in the subframe, and/or a shortened PUSCH and/or PUCCH format that does not use both the first and last symbols in a subframe may be defined.

The WTRU may use one or more of the shortened formats based on an indication from the network as to whether the use of one or more such shortened formats are allowed or an indication from the network that the WTRU should use one or more of the shortened formats. It may also be based on the timing relationship, e.g., the WTRU's UL timing relationship, between the CCs.

The WTRU may maintain two states (a first state of no TA difference and a second state of less than one symbol TA difference), and implement any one of the embodiments disclosed above for transmissions of an SRS and other channels based on the state.

The embodiments disclosed above may be extended to the case where the TA difference is greater than one symbol, for example in the range of 1-2 symbols. FIGS. 6A-6C show examples of SRS and other channel transmissions in case of TA difference of more than one symbol.

In FIG. 6A, an SRS 602 is scheduled in a more advanced CC. The WTRU may transmit the scheduled SRS 602 for a given CC in subframe i if a PUSCH or a PUCCH is not mapped to both the second and third last symbols 604, 606 of another CC (less advanced CC) in subframe i. The WTRU may drop the scheduled SRS 602 for a given CC in subframe i if a PUSCH or a PUCCH is mapped to the second or third last symbols 604, 606 of another CC (less advanced CC) in subframe i.

In FIG. 6B, an SRS 612 is scheduled in a less advanced CC. In this case, a cross-subframe interference may occur between SRS in a present subframe and other channels in a future subframe. The WTRU may transmit a scheduled SRS 612 for a given CC in subframe i if a PUSCH or a PUCCH is not mapped to both the first and second symbols 614, 616 in subframe i+1 of another CC (more advanced CC). The WTRU may drop a scheduled SRS 612 for a given CC in subframe i if a PUSCH or a PUCCH is mapped to the first or second symbol 614, 616 of another CC (more advanced CC) in subframe i+1.

In FIG. 6C, SRSs 622, 624 are scheduled in both CCs. In this case, a cross-subframe interference may occur between an SRS in a present subframe and other channels in a future subframe, or between an SRS in a past subframe and other channels in a present subframe. A WTRU may transmit an SRS 622, 624 scheduled simultaneously on 2 CCs if the WTRU does not use (e.g., a PUSCH and a PUCCH are not mapped to) the two last symbols 630, 632 in the current subframe (subframe i) of the less advanced CC and the WTRU does not use (e.g., a PUSCH and a PUCCH are not mapped to) the first two symbols 626, 628 in the next subframe (subframe i+1) of the more advanced CC.

In the above embodiments, the WTRU may maintain three states (e.g., a first state of no TA difference, a second state of less than one symbol TA difference, and a third state of more than one symbol TA difference), and implement any one of the embodiments disclosed above for transmissions of SRS and other channels based on the state.

Figures 7, 8:
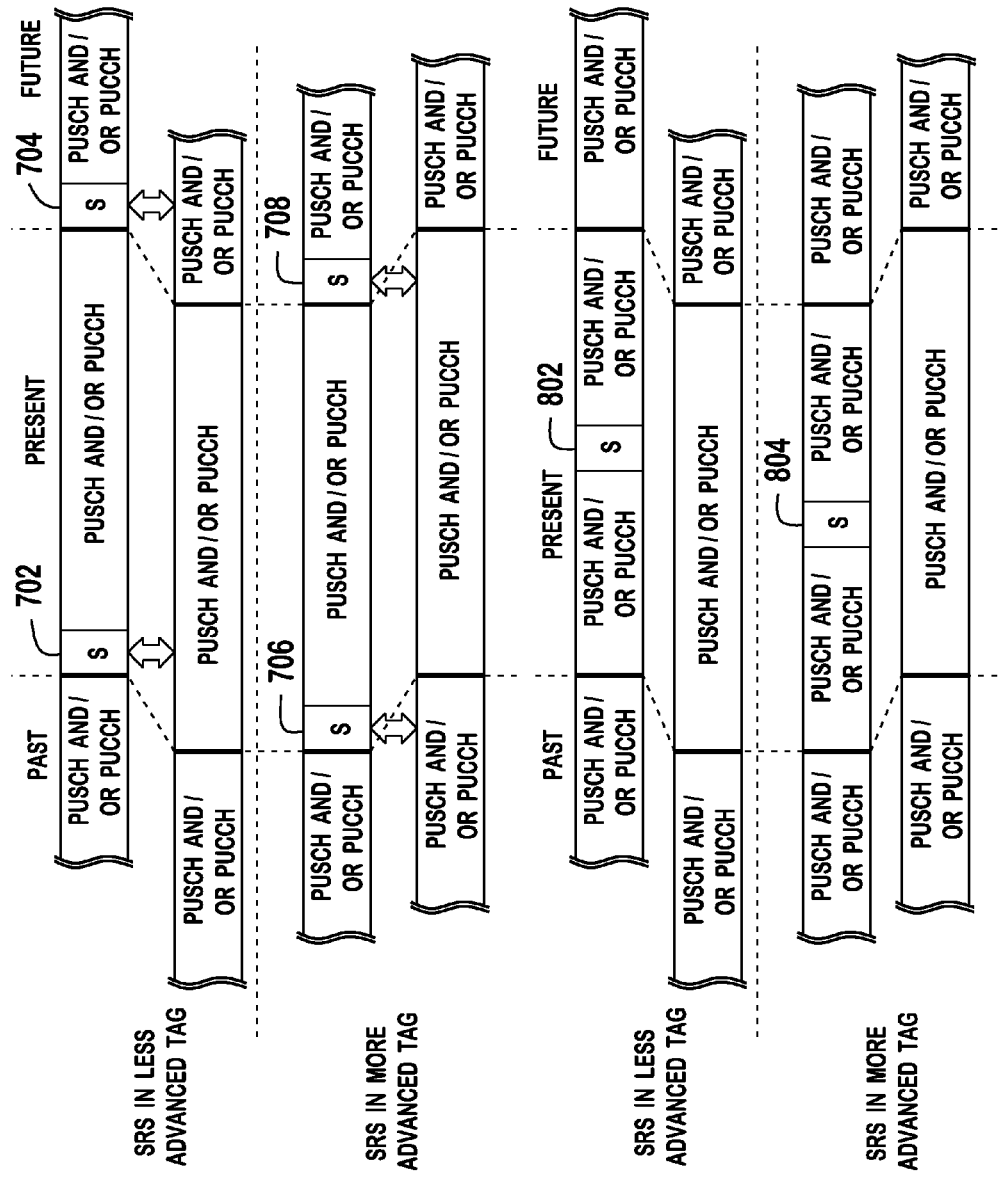
FIG. 7 shows an example of cross-subframe conflicts for the case of SRS being at the front of a subframe.
FIG. 8 shows an example of SRS included in the middle of subframe.

In another embodiment, an SRS may be included at the start, rather than at the end, of a subframe. FIG. 7 shows an example of cross-subframe conflicts for the case of SRS being at the front of a subframe. In a case where an SRS is in a less advanced TAG, a PUSCH or a PUCCH in the present subframe may conflict with an SRS 702 in the present subframe, and an SRS 704 in the future subframe may conflict with a PUSCH or a PUCCH in the future subframe. In a case where an SRS is in a more-advanced TAG, a PUSCH or a PUCCH in the past subframe may conflict with an SRS 706 in the present subframe, and an SRS 708 in the future subframe may conflict with a PUSCH or a PUCCH in the present subframe.

The WTRU may not transmit an SRS to avoid the cross-subframe conflict, as the WTRU may have knowledge while processing the present subframe. For example, for the present subframe, the WTRU may decide to not transmit an SRS because it may conflict with a PUSCH or a PUCCH in the past subframe, and the WTRU may know about the channels in the past subframe at this decision point. In addition, in processing a PUSCH and/or a PUCCH in the present subframe, at that point in time the WTRU may have knowledge of the SRS in the future subframe, and may puncture a PUSCH and/or shorten a PUCCH in the present subframe to accommodate the SRS in the future subframe.

With an SRS at the front of a subframe, the first (or first two) symbol(s) of a PUSCH may need to be punctured, rather than the last symbol, and a shortened PUCCH may start after SRS and end at the end of the subframe, rather than start at the start of the subframe, and end at the next-to-last symbol.

In another embodiment, in order to avoid cross-subframe conflicts, an SRS may be included in the middle, (e.g., not the first or last symbol), of a subframe. FIG. 8 shows an example of an SRS 802, 804 included in the middle of subframe. So long as the UL timing difference is on the order of less than half of a subframe, there may be no cross-subframe conflicts whether the SRS is included in the more or less advanced TAG. With an SRS in the middle of a subframe, one (or two) PUSCH symbol(s) may need to be punctured towards the middle of the subframe, and a shortened PUCCH may be split around each side of SRS.

Embodiments disclosed above may be applied in one or more of the following cases: (1) when a WTRU is operating with intra-band CA (it may be limited to the case where the WTRU has at least 2 activated UL CCs), (2) when a WTRU is operating with inter-band CA (it may be limited to the case where the WTRU has activated UL CCs in more than one band), (3) when a WTRU is operating with two or more independently controlled TA loops (e.g., the WTRU has at least two TAGs), or (4) when a WTRU is specifically instructed by the eNB to apply the embodiments, (e.g., via RRC or other signaling).

The embodiments disclosed above for SRS and other UL transmissions may be applied always or when one or more of the above conditions (1)-(4) is true. Alternatively, the embodiments above may be applied adaptively, for example, when one of the conditions (1)-(4) above is true and the difference between the largest and smallest applied TA, (e.g., the length of the overlapping portion, the TA difference, or the UL timing difference), is greater than a threshold.

The embodiments may not be applied, for example even when the above conditions are true, if the difference used for the decision is less than a threshold. Hysteresis may be employed, (e.g., two different thresholds may be used, one for starting to use these embodiments, and another for stopping the use of these embodiments). The embodiments may or may not be applied after signaling the condition warranting applying or not applying the embodiments, starting at a certain subframe such as subframe k+4 after reporting the condition at subframe k. The embodiments may or may not be applied after signaling the condition warranting applying or not applying the embodiments, starting at a certain subframe such as subframe k+4 after the WTRU receives a HARQ ACK of the report at subframe k.

When comparing a TA (or UL timing) difference to a threshold, the magnitude of the difference may be what is relevant, (e.g., it may not matter which CC is more or less advanced).

For proper UL communications, the eNB may need to be aware of the rules the WTRU applied to its UL transmissions such as the rules the WTRU applied for simultaneous SRS and other channel transmissions. In order for the eNB to know whether the embodiments are or are not used in any given subframe, the eNB may calculate or infer the TA (or UL timing) difference in the WTRU.

For the case of the WTRU using one common DL timing reference, the WTRU and the eNB may calculate or infer the maximum, (e.g., the largest amongst the CCs), TA difference in the WTRU as a difference between Rx-Tx time difference measurement in each CC. The maximum TA difference may be computed as follows:

$$\Delta TAps = (TAp - TAs),\qquad\text{Equation (15)}$$

where TAp may be the Rx-Tx time difference measurement for one cell, (e.g., PCell), and TAs may be the Rx-Tx time difference measurement for another cell, (e.g., an SCell). The WTRU may report this measurement for one or more cells to the eNB where the report (e.g., report parameters, report contents, and the like) may be based on signaling (e.g., measurement configuration) from the eNB.

For the case of the WTRU using different DL timing references for two or more CCs, (e.g., PCell and one or more SCells), the WTRU and the eNB may calculate or infer the maximum TA difference in the WTRU using the same way as for the common DL reference case. Alternatively, the WTRU and the eNB may measure or determine the UL timing difference as the applied TA difference minus the received DL reference timing difference. For example, the WTRU and the eNB may add a reference signal time difference (RSTD)-like measurement for each SCell or TAG which may provide the time difference between the DL references of two cells or two TAGs (e.g., ΔTREF=TREFp−TREFs), or compute UL timing difference as applied TA difference (ΔTAps) minus the RSTD-like measurement (e.g., (TAp−TAs)−(TREFp−TREFs)).

Figure 9:
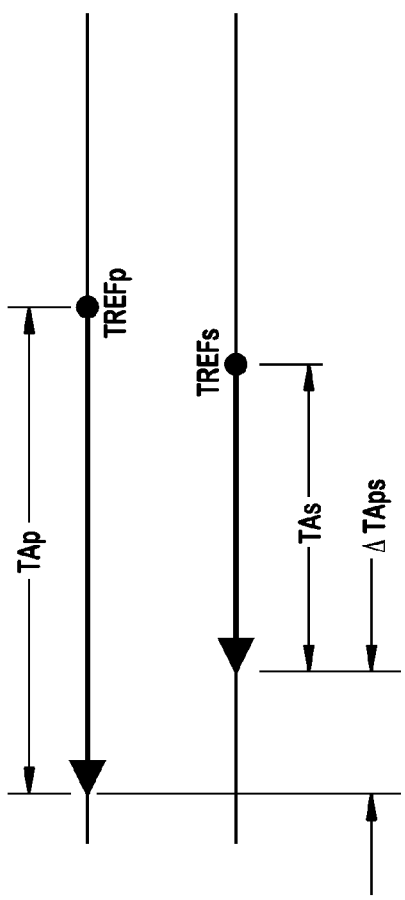
FIG. 9 shows an example of the use of measurements to determine a TA difference between two cells.

FIG. 9 shows an example of the use of measurements to determine TA difference between two cells (e.g., PCell and SCell). The term ΔTAps may be referred to as ΔTA, where it may be understood that the difference is between two CCs (e.g., primary and secondary CCs) in two different TAGs, or the two respective TAGs.

The WTRU may compute, treat, and/or report ΔTA as described above, or in a simpler way (e.g., ignoring the timing reference difference). The WTRU may compute, treat, and/or report ΔTA as described, but instead of using the difference of actual timing advance applied to multiple CCs or TAGs using the timing advance commands (e.g., accumulated timing advance commands) received from the eNB and ignoring WTRU autonomous uplink timing adjustments.

In another embodiment, a WTRU may calculate the TA or UL timing difference and report it to the eNB. Such reports may be in conjunction with the WTRU starting or stopping special processing for large TA difference (the timing reference may be the PCell), or just the reporting with the expectation that the network will use such reports to avoid large TA difference conflicting UL transmissions, for example, by scheduling policies in cell load balancing or by deactivating the problematic SCell(s) in a TAG.

The WTRU may report one or more of the following, either periodically or event-driven: the TA or UL timing of CCs or TAGs, the TA or UL timing difference between two CCs or TAGs, the largest TA or UL timing difference between any two CCs or TAGs, the UL timing difference relative to PCell for any SCell TAG, the UL timing difference relative to PCell for any SCell TAG configured to report such UL timing difference (e.g., by RRC), the ordinal relative timing difference between TAGs (e.g., a list of TAGs from most advanced to least advanced or vice versa, or an indication of the most advanced TAG), an indication when a TA or UL timing difference crosses a threshold (e.g., when the largest TA or UL timing difference crosses a threshold), an indication that the WTRU has, is about to enter, or left the state of processing given large TA difference (this may be coupled with an indication or report of TAG timing difference), or the like.

The event triggering the reporting may be activation of a first SCell in a TAG, (e.g., starting-up of an additional TAG that may start periodic reporting), or deactivation of the last SCell in a TAG, (e.g., stopping of a TAG that may be followed by no more periodic reports). The reports may be by PHY signaling, MAC control element (CE), or RRC signaling. The reports carried into a MAC CE may be sent together with the power headroom reporting for the concerned SCell TAG.

Embodiments for handling transmit power when there is UL timing difference or TA difference are disclosed hereafter.

Conventional rules for a WTRU to avoid exceeding its maximum allowed output power, (e.g., its total configured maximum output power), when transmitting on multiple CCs are typically predicated on the UL subframe boundaries of the CCs coinciding (e.g., exactly or nearly exactly coinciding), for example assuming that there is no overlap (e.g., adjacent subframe overlap) due to TA difference or no TA difference among CCs. However, when there is a TA difference, applying the conventional maximum power rules is not sufficient in all cases.

For example, when there is a TA difference among CCs, there may be simultaneous transmission of an SRS in one CC and a PUSCH and/or a PUCCH in another CC due to adjacent subframe overlap. For example, for a TA difference of up to 60 μs, which may correspond to up to approximately 84% of a symbol period in which an SRS may be transmitted, there may be simultaneous transmission of an SRS in one CC and a PUSCH and/or a PUCCH in another CC. This is not considered in the conventional maximum power rules.

In another example, when there is a TA difference among CCs, a PUSCH in one CC may share power with a PUSCH in another CC that is nominally in an adjacent subframe. This is not considered in the conventional maximum power rules or PUSCH scaling rules.

In embodiments described herein, maximum power may be replaced by configured maximum power, configured maximum output power, total configured maximum output power, total configured maximum WTRU output power, and other like terminology. These and other like terms may be used interchangeably.

In one embodiment, for subframes without SRS, in case of no PUSCH with UCI, the PUSCH power may be scaled as follows:

$$\sum_c w(i) \cdot f_{\Delta TA}(\hat{P}_{PUSCH,c}(i)) \le (\hat{P}_{CMAX}(i) - \hat{P}_{PUCCH}(i)), \quad \text{Equation (16)}$$

where $f_{\Delta TA}$ is a function of multiple variables, where each of the variables may be the nominal channel power in the current and adjacent subframes. For example, $f_{\Delta TA}$ may be as follows:

$$f_{\Delta TA}(\hat{P}_{PUSCH,c}(i)) = \max(\hat{P}_{PUSCH,c}(i), \hat{P}_{PUSCH,c}(j)), \quad \text{Equation (17)}$$

where i is the current (or present) subframe (i.e., the one for which the powers are being computed), j=i−1 for the CC with less TA (or less advanced UL timing), and j=i+1 for the CC with more TA (or more advanced UL timing). Instead of the max(x,y) function in the above example, a different function, for example, a weighted average of PUSCH power in each of the two subframes may be employed. Such weighting may be a function of the TA (or UL timing) difference between the two CCs, for example:

$$f_{\Delta TA}(\hat{P}_{PUSCH,c}(i)) = \left(1 - \frac{\Delta TA}{1000}\right) \cdot \hat{P}_{PUSCH,c}(i) + \left(\frac{\Delta TA}{1000}\right) \cdot (\hat{P}_{PUSCH,c}(j)), \quad \text{Equation (18)}$$

where ΔTA is the TA difference in microseconds.

Any or all power terms, (for example, $\hat{P}_{PUSCH,c}(i)$, $\hat{P}_{PUCCH}(i)$, or $\hat{P}_{CMAX}(i)$), in any of the embodiments disclosed herein may be replaced with a function $f_{\Delta TA}(\cdot)$ of such term in any or all of the power control formulas.

In case a PUSCH and/or a PUCCH overlaps with an SRS because of UL timing difference, the SRS may be adjusted or scaled, for example to avoid exceeding the maximum allowed power, (e.g., the WTRU total configured maximum output power).

In case where an SRS is in the more advanced CC, (e.g., as shown in FIG. 5A), if there is no transmission in the diagonally cross hatched symbol 504 but there is a transmission in the horizontally cross hatched symbol 506, an SRS power in that CC may be set by reducing the available transmit power in the CC, (e.g., $P_{CMAX,c}$), by some fraction of the power of other channels in the CC. The fraction may be a function of the TA (or UL timing) difference between the CCs. For example, the SRS power may be set as follows:

$$P_{SRS,c}(i) = \min\left\{10\log_{10}\left(\hat{P}_{CMAX,c}(i) - \frac{\Delta TA}{T_{symb}}\left(\hat{P}_{PUCCH}(i) + \sum_c \hat{P}_{PUSCH,c}(i)\right)\right), P_{SRS\_OFFSET,c}(m) + \ldots + f_c(i)\right\} [dBm],$$

Equation (19)

where $T_{symb}$ is the symbol period, (e.g., 83.3 μs for extended CP or 71.4 μs for normal CP), and $$P_{SRS\_OFFSET,c}(m) + \ldots + f_c(i) = P_{SRS\_OFFSET,c}(m) + 10\log_{10}(M_{SRS,c}) + P_{O\_PUSCH,c}(j) + \alpha_c(j) \cdot PL_c + f_c(i).$$

Equation (20)

It should be noted that TA and ΔTA may be replaced by UL timing and UL timing difference, respectively in any of the embodiments disclosed herein.

For the case of transmission in both the horizontally and diagonally cross hatched symbols 504, 506 in FIG. 5A, the SRS power may be set as follows:

$$P_{SRS,c}(i) = \min\left\{10\log_{10}\left(\hat{P}_{CMAX,c}(i) - \left(\hat{P}_{PUCCH}(i) + \sum_c \hat{P}_{PUSCH,c}(i)\right)\right), P_{SRS\_OFFSET,c}(m) + \ldots + f_c(i)\right\} [dBm].$$

Equation (21)

In case where an SRS is in the less advanced CC, (e.g., as shown in FIG. 5B), if there is no transmission in the diagonally cross hatched symbol 514 but there is a transmission in the horizontally cross hatched symbol 516, the SRS power may be set as follows:

$$P_{SRS,c}(i) = \min\left\{10\log_{10}\left(\hat{P}_{CMAX,c}(i) - \frac{\Delta TA}{T_{symb}}\left(\hat{P}_{PUCCH}(j) + \sum_c \hat{P}_{PUSCH,c}(j)\right)\right), P_{SRS\_OFFSET,c}(m) + \ldots + f_c(i)\right\} [dBm],$$

Equation (22)

where j=i+1.

For the case of transmission in both the horizontally and diagonally cross hatched symbols 514, 516, the SRS power may be set as follows:

$$P_{SRS,c}(i) = \min\left\{10\log_{10}\left(\hat{P}_{CMAX,c}(i) - \max\left(\frac{\Delta TA}{T_{symb}}\left(\hat{P}_{PUCCH}(j) + \sum_c \hat{P}_{PUSCH,c}(j)\right), \left(1 - \frac{\Delta TA}{T_{symb}}\right)\left(\hat{P}_{PUCCH}(i) + \sum_c \hat{P}_{PUSCH,c}(i)\right)\right)\right), P_{SRS\_OFFSET,c}(m) + \ldots + f_c(i)\right\} [dBm].$$

Equation (23)

In case where an SRS is transmitted in both CCs, (e.g., as shown in FIG. 5C), if there is a transmission in the horizontally cross hatched symbols 526, 528, the SRS power per CC may be set per the above embodiments for each SRS in the more and less advanced CC, respectively, and then scaled as follows:

$$\sum_c w(i) \cdot \hat{P}_{SRS,c}(i) \leq \hat{P}_{CMAX}(i) - \frac{\Delta TA}{T_{symb}}\max\left(\hat{P}_{PUCCH}(i) + \sum_c \hat{P}_{PUSCH,c}(i), \hat{P}_{PUCCH}(j) + \sum_c \hat{P}_{PUSCH,c}(j)\right).$$

Equation (24)

The embodiments disclosed above may reflect an SRS having lower priority than a PUCCH or a PUSCH.

In the above equations, the factors $$\frac{\Delta TA}{T_{symb}} \text{ and } 1 - \frac{\Delta TA}{T_{symb}},$$

intended as weighting factors as a function of the TA difference between the CCs, are examples and different factors may be employed.

Allowing for simultaneous transmissions of a PRACH and other channel(s), the above inequality may be modified as follows:

$$\sum_c w(i) \cdot \hat{P}_{SRS,c}(i) \leq \hat{P}_{CMAX}(i) - \frac{\Delta TA}{T_{symb}}\max\left(\begin{array}{l}\hat{P}_{PRACH}^{SRS}(i) + \hat{P}_{PUCCH}(i) + \sum_c \hat{P}_{PUSCH,c}(i), \\ \hat{P}_{PRACH}(j) + \hat{P}_{PUCCH}(j) + \sum \hat{P}_{PUSCH,c}(j)\end{array}\right),$$

Equation (25)

where $\hat{P}_{PRACH}(i)$ may be the linear equivalent of $P_{PRACH}$ in subframe i, $\hat{P}_{PRACH}^{SRS}(i)$ may be $\hat{P}_{PRACH}(i)$ during the SRS symbol in subframe i (which may be zero in the last or only subframe of a preamble).

Alternatively, the SRS may be dropped rather than scaling the SRS when $\sum_c \hat{P}_{SRS,c}$ would or is to exceed the available power.

In case where an SRS and a PUCCH and/or PUSCH may be scheduled in a present subframe, if it has been determined to use a shortened PUCCH format and/or to shorten the PUSCH to allow transmission of the scheduled SRS, but subsequently the WTRU, being power-limited due to partial overlap of an SRS in the present subframe and a PUSCH, a PUCCH, or a PRACH in the next subframe, decides not to transmit the SRS in the present subframe, the WTRU may restore the PUCCH and/or the PUSCH in the present subframe to their original format and/or size. Alternatively, the WTRU may not restore the PUCCH and/or the PUSCH.

For carrier aggregation (CA) with UL serving cells, the WTRU may determine (or set) the total configured maximum WTRU output power $P_{CMAX}$ within a lower and upper bound as follows:

$$P_{CMAX\_L\_CA} \leq P_{CMAX} \leq P_{CMAX\_H\_CA}. \qquad \text{Equation (26)}$$

In one embodiment, a WTRU may avoid exceeding the maximum power when there is a TA (or UL timing) difference by adding an additional power backoff term (e.g., an MPR-like term) to the lower limit of the configured maximum WTRU output power for CA. This may, in effect, be treating the power from the past subframe that is overlapping into the present subframe as a higher priority by reducing, (e.g., backing off), the transmit power available to the channels scheduled for the current subframe.

Figure 10:
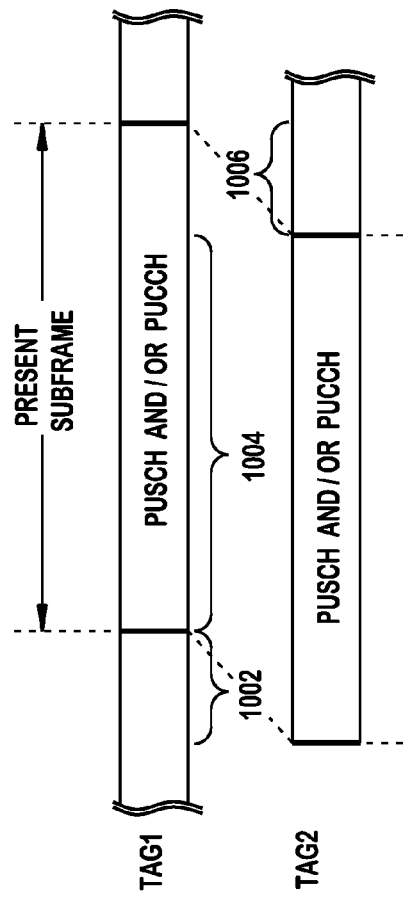
FIG. 10 shows an example of potential interference between the past subframe to the present subframe.

FIG. 10 shows an example in which there may be interference between the past subframe to the present subframe. As shown in FIG. 10, a WTRU may know how much interference TAG1's past subframe may cause to TAG2's present subframe (1002) and how much interference TAG2's present subframe may cause to TAG1's present subframe (1004), but may not know how much interference TAG2's future subframe may cause to TAG1's present subframe (1006), which may be ignored.

For the present subframe, the transmit power of the past subframe may be known, whereas the transmit power in the future subframe may not be known. As the transmit power in the past subframe has already been determined, the WTRU may backoff the maximum transmit power available in the present subframe for the present subframe to accommodate transmit power in the past subframe that overlaps to the present subframe. The power overlapping from the past subframe into the present subframe, averaged out over the entire present subframe, may be at most a small fraction of $P_{CMAX}(i)$, and any adverse effects of the overlap (e.g., excessive adjacent channel or out-of-band interference) which may be generated by the WTRU during the relatively brief overlap period may be averaged out over the subframe period.

For any given CC, the interfering power from an overlapping subframe may be from a different CC. Therefore, instead of applying a backoff to $P_{CMAX,c}(i)$ (e.g., the configured maximum WTRU output power for a serving cell c for subframe i), a backoff may be applied to the WTRU as a whole, as a factor for reducing $P_{CMAX}(i)$ (e.g., the total configured maximum WTRU output power for subframe i). For example, the backoff may be applied to the lower limit of $P_{CMAX}(i)$, which may also be referred to herein as simply $P_{CMAX}$. For example, for carrier aggregation such as inter-band carrier aggregation, (e.g., with up to one serving cell per operating band), the lower limit of $P_{CMAX}$, $P_{CMAX\_L\_CA}$, may include a new power backoff term (that may be referred to as TA maximum power reduction (T-MPR) or tmpr where T-MPR may be a value in dB and tmpr may be the linear value of T-MPR) or alternatively, one or more terms may be included in the equation used to determine $P_{CMAX\_L\_CA}$. For example, for inter-band CA or non-contiguous intra-band CA, $P_{CMAX\_L\_CA}$ may be determined as follows:

$$P_{CMAX\_L\_CA} = \text{MIN}\{10 \log_{10} \Sigma \text{MIN}[p_{EMAX,c}/(\Delta t_{C,c}), p_{PowerClass}/(mpr_c \cdot a\text{-}mpr_c \cdot \Delta t_{C,c} \cdot \Delta t_{IB,c}) \cdot p_{PowerClass}/(pmpr_c \cdot \Delta t_{C,c}) \cdot p_{PowerClass}/(tmpr \cdot \Delta t_{C,c})], p_{PowerClass}\}; \qquad \text{Equation (27)}$$

or alternatively as follows:

$$P_{CMAX\_L\_CA} = \text{MIN}\{10 \log_{10} \text{MIN}[p_{EMAX,c}/(\Delta t_{C,c}), p_{PowerClass}/(mpr_c \cdot a\text{-}mpr_c \cdot tmpr \cdot \Delta t_{C,c} \cdot \Delta t_{IB,c}), p_{PowerClass}/(pmpr_c \cdot \Delta t_{C,c})], p_{PowerClass}\}. \qquad \text{Equation (28)}$$

Alternatively, the backoff may be included, (e.g., for intra-band carrier aggregation, or intra-band contiguous CA), in the lower limit of $P_{CMAX}$ as follows:

$$P_{CMAX\_L\_CA} = \text{MIN}\{10 \log_{10} p_{EMAX,c} - \Delta T_C, P_{PowerClass} - \text{MAX}(MPR + A\text{-}MPR + T\text{-}MPR, P\text{-}MPR) - \Delta T_C\}. \qquad \text{Equation (29)}$$

In any of the embodiments above, the T-MPR (or tmpr) may be the same for all CCs or may have a CC-specific value.

In another embodiment, $P_{CMAX}$ may be initially determined without consideration for the overlap and then a backoff may be applied to the $P_{CMAX}$ based on the overlap, as follows:

$$P_{CMAX} \text{ accounting for overlap} = (P_{CMAX} \text{ excluding overlap}) - T\text{-}MPR), \qquad \text{Equation (30)}$$

Using $P_{CMAX}(i)$ to represent $P_{CMAX}$ excluding overlap in subframe i and $F_{CMAXov}(i)$ to represent $P_{CMAX}$ accounting for overlap in subframe i, $P_{CMAX}$ accounting for overlap in subframe i may be written as follows:

$$P_{CMAXov}(i) = P_{CMAX}(i) - T\text{-}MPR, \text{ or} \qquad \text{Equation (31)}$$

$$P_{CMAXov}(i) = P_{CMAX}(i) - T\text{-}MPR(i). \qquad \text{Equation (32)}$$

In linear form, it may be written as follows:

$$p_{CMAXov}(i) = p_{CMAX}(i)/tmpr, \text{ or} \qquad \text{Equation (33)}$$

$$p_{CMAXov}(i) = p_{CMAX}(i)/tmpr(i). \qquad \text{Equation (34)}$$

In this case, determination of exceeding maximum power and/or scaling for power control may be done with respect to $P_{CMAXov}(i)$ instead of $P_{CMAX}(i)$ (or $p_{CMAXov}(i)$ instead of $p_{CMAX}(i)$).

In another embodiment, $P_{CMAX\_L\_CA}$ may be determined without consideration for the overlap and then the backoff may be applied as follows:

$$P_{CMAX\_L\_CA} \text{ accounting for overlap} = (P_{CMAX\_L\_CA} \text{ excluding overlap} - T\text{-}MPR). \qquad \text{Equation (35)}$$

$P_{CMAX\_L\_CA}$ (e.g., for inter-band CA) may be calculated as follows:

$$P_{CMAX\_L\_CA} = \text{MIN}\{10 \log_{10} \Sigma \text{MIN}[p_{EMAX,c}/(\Delta t_{C,c}), p_{PowerClass}/(mpr_c \cdot a\text{-}mpr_c \cdot \Delta t_{C,c} \cdot \Delta t_{IB,c}) \cdot p_{PowerClass}/(pmpr_c \cdot \Delta t_{C,c})], p_{PowerClass}\} - T\text{-}MPR. \qquad \text{Equation (36)}$$

Alternatively, $P_{CMAX\_L\_CA}$ (e.g., for intra-band CA), may be calculated as follows:

$$P_{CMAX\_L\_CA} = \text{MIN}\{10 \log_{10} \Sigma p_{EMAX,c} - \Delta T_C, P_{PowerClass} - \text{MAX}(MPR + A\text{-}MPR, P\text{-}MPR) - \Delta T_C\} - T\text{-}MPR. \qquad \text{Equation (37)}$$

Addition of the additional backoff T-MPR which may be in dB form (or tmpr which may be in linear form) may allow a WTRU to lower the lower limit of the configured maximum output power or the configured maximum output power itself to avoid the effect of TA (or UL timing) difference which may cause the WTRU to exceed the configured maximum output power during a given subframe or a given measurement period (e.g., 1 ms).

In another embodiment, the additional backoff may be applied to both the lower limit and upper limit of $P_{CMAX}(i)$. For example, for intra-band CA and/or inter-band carrier aggregation (e.g., with up to one serving cell c per operating band), $P_{CMAX\_H\_CA}$, may be calculated as one of the following:

$$P_{CMAX\_H\_CA} = \text{MIN}\{10 \log_{10} \Sigma p_{EMAX,c}, p_{PowerClass}/tmpr\}; \qquad \text{Equation (38)}$$

$$P_{CMAX\_H\_CA} = \text{MIN}\{10 \log_{10} \Sigma \text{MIN}[p_{EMAX,c}, p_{PowerClass}/pmpr_c], p_{PowerClass}/tmpr\}; \qquad \text{Equation (39)}$$

$$P_{CMAX\_H\_CA} = \text{MIN}\{10 \log_{10} \Sigma p_{EMAX,c} P_{PowerClass}\} - T\text{-}MPR; \text{ or} \quad \text{Equation (40)}$$

$$P_{CMAX\_H\_CA} = \text{MIN}\{10 \log_{10} \Sigma \text{MIN} [p_{EMAX,c} P_{PowerClass}/pmpr_c]\} - T\text{-}MPR. \quad \text{Equation (41)}$$

The T-MPR may be a power reduction value or a power reduction allowance such that the WTRU may choose an actual reduction value less than or equal to that allowance value.

The amount of T-MPR allowed or actual power backoff may be either 0 dB, a fixed value, or a value from a set which may include more than one value, (e.g., 0 for small $\Delta TA$ and some value for large $\Delta TA$). The T-MPR may be selected by a WTRU, for example from a list. The list may be specified or provided by the network to the WTRU. The network may signal to the WTRU, (e.g., via physical layer signaling, MAC CE, RRC signaling, or the like), an index into the list to use. Alternatively, the WTRU may autonomously determine the index, for example as a function of $\Delta TA$. Example of fixed values or lists are $\{0,1\}$ dB, or $\{0, 0.5, 1.0\}$ dB.

The WTRU may determine the T-MPR as a function of the transmit power in the previous subframe, as well as, or instead of, a function of $\Delta TA$. For example, for any given $\Delta TA$, less transmit power in subframe i–1 may result in less T-MPR in subframe i.

The T-MPR for the present subframe may be determined as a function of one or more of the following: the number of TAGs with activated CCs with configured UL in one or more of the past, present, and future subframes, the number of TAGs with scheduled UL transmission in one or more of the past, present, and future subframes, or the number of bands of the CCs with UL transmission in one or more of the past, present, and future subframes.

The T-MPR may be applicable (e.g., only applicable) in subframes with a potential overlap, (e.g., when the WTRU is scheduled to transmit in the UL in at least one TAG in the present subframe and a TAG other than that TAG in the past or future subframe).

The T-MPR may be a function of one or more of the $\Delta TAs$ (or UL timing differences) between the CCs in different TAGs. For example, the T-MPR may be a function of the largest $\Delta TA$ (or UL timing difference) between each pair of TAGs. This may be applicable to TAGs with UL transmission in one or more of the present, past, or future subframes. A larger $\Delta TA$ (or UL timing difference) may result in, or correspond to, a larger T-MPR.

The T-MPR may be a function of the amount of overlap, for example a function of the overlap time divided by the subframe time or the time for the symbols (which may exclude the CP time).

The WTRU may determine the T-MPR for the present subframe as a function of the transmit power in the past subframe and/or the transmit power in the future subframe. The transmit power in the past subframe may be the actually determined transmit power which may be after any scaling is done and may or may not account for the T-MPR determined for that subframe. The transmit power in the future subframe may be the calculated transmit power for that subframe which may be after any scaling and may or may not account for the T-MPR for that subframe.

The WTRU may determine the T-MPR for the present subframe as a function of $P_{CMAX}$ in the past subframe and/or $P_{CMAX}$ in the future subframe. $P_{CMAX}$ used for the past subframe may or may not account for T-MPR determined for that subframe. $P_{CMAX}$ for the future subframe may or may not account for T-MPR for that subframe.

After the WTRU determines the T-MPR, the WTRU may determine the actual backoff value to use. The WTRU may determine the T-MPR allowance and/or the actual backoff on a subframe by subframe basis.

In the above embodiments, $\Delta TA$ may be replaced with UL timing difference.

Determination of the PUCCH transmit power for subframe i and the scaling rules for the PUSCH transmit power may be based on the assumption that $P_{CMAX,c}(i)$ for the PCell is not greater than $P_{CMAX}(i)$. However, with the backoff of T-MPR applied to $P_{CMAX}(i)$ but not to $P_{CMAX,c}(i)$ of the PCell, this assumption may not necessarily be true. To compute $P_{PUCCH}(i)$ while allowing for $P_{CMAX,c}(i)$ for the PCell to be greater than $P_{CMAX}(i)$, the WTRU may determine PUCCH power, e.g., in a first step in scaling, as follows:

$$\hat{P}_{PUCCH}(i) = \min(\hat{P}_{PUCCH}(i), \hat{P}_{CMAX}(i)). \quad \text{Equation (42)}$$

Alternatively, PUCCH power may be determined as follows:

$$P_{PUCCH}(i) = \min\{\min(P_{CMAX}(i), P_{CMAX,c}(i))P_{0\_PUCCH} + PL_c + h(n_{CQI}, n_{HARQ}, n_{SR}) + \Delta_{F\_PUCCH}(F) + \Delta_{TxD}(F') + g(i)\}, \quad \text{Equation (43)}$$

where c is the CC on which PUCCH may be transmitted, e.g., the PCell.

After determining $P_{PUCCH}(i)$, the following maybe performed:

$$\hat{P}_{PUCCH}(i) = \min(\hat{P}_{PUCCH}(i), \hat{P}_{MAX}(i)). \quad \text{Equation (44)}$$

$P_{CMAXov}(i)$ may replace $P_{CMAX}(i)$ in the equations above. The linear equivalent of $P_{CMAXov}(i)$ may replace the linear equivalent of $P_{CMAX}(i)$ in the equations above.

A PRACH transmission may last for some period of time, denoted as $T_{CP}+T_{SEQ}$, depending on the PRACH preamble format. Such periods are nominally one to three subframes. During the last subframe of a two-subframe or three-subframe transmission, or the single subframe of a one-subframe PRACH transmission, the PRACH transmission may end before the end of the last or the single subframe. The number of full subframes and the unused portion of the last or the single subframe for each preamble format may, for example, be as given in Table 1. For example, a PRACH preamble format 1 transmission may last for one full subframe followed by approximately 48% of a second subframe.

TABLE 1

| PRACH preamble format | $T_{CP}$ (Ts) | $T_{SEQ}$ (Ts) | Length of preamble including CP, μs | Number of full sub-frames | Empty space at end of last subframe of preamble, μs |
|---|---|---|---|---|---|
| 0 | 3168 | 24576 | 903.12 | 0 | 96.88 |
| 1 | 21024 | 24576 | 1484.38 | 1 | 515.62 |
| 2 | 6240 | 2 × 24576 | 1803.13 | 1 | 196.87 |
| 3 | 21024 | 2 × 24576 | 2284.38 | 2 | 715.62 |
| 4 (TDD) | 448 | 4096 | 147.92 | 0 | 852.08 |

A PRACH in the past subframe may or may not have any effect needed to be included in determining the T-MPR for the present subframe. A PRACH transmission may occupy the entire past subframe if it is not the last subframe of a multi-subframe PRACH, (e.g., PRACH preamble format 1, 2, or 3). In this case, the impact of the PRACH in the past subframe may be similar to that of a PUSCH and/or a PUCCH in the past subframe. However, for the case of the past subframe being either the single subframe (e.g., in case of PRACH preamble format 0 or 4) or the last subframe (e.g., in case of PRACH preamble format 1, 2, or 3) of the PRACH transmission, there may or may not be an overlap of the past PRACH into the present subframe.

Figure 11:
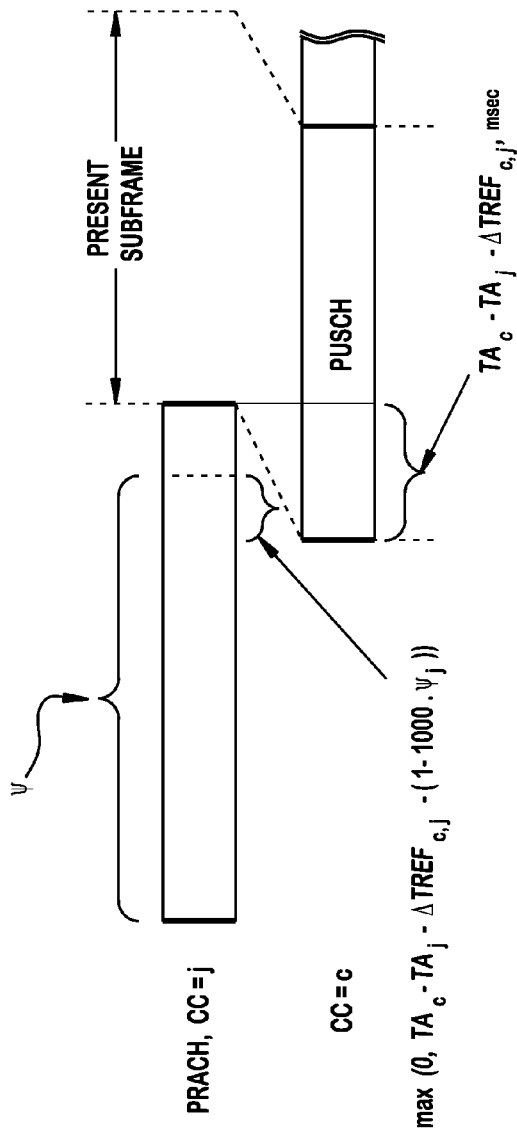
FIG. 11 shows an example of overlap of a physical random access channel (PRACH) in the past subframe into the present subframe.

FIG. 11 shows an example of overlap of a PRACH in the past subframe into the present subframe. In this example, ψ is length of the PRACH transmission in the past subframe. ψ is $\mod(T_{CP}(\bullet)+T_{SEQ}(\bullet), 0.001)$ seconds for the last PRACH frame and 0.001 seconds for other PRACH frames. $T_{CP}(\bullet)$ is the length of the PRACH preamble CP part and $T_{SEQ}(\bullet)$ is the length of the PRACH preamble sequence part, and mod( ) is the modulo operation. The fraction of the PRACH power in the past subframe that overlaps into the present subframe may be as follows:

$$Q(i)=\max[0,TA_c(i)-TA_j(i)-\Delta TREF_{c,p}(i)-(1-1000\cdot\psi(i-1))]\cdot(\hat{P}_{PRACH}(i-1)), \quad \text{Equation (45)}$$

where p is the PCell in subframe i.

The WTRU may use the factor Q(i) to determine the impact of PRACH in the past subframe on T-MPR for the present subframe.

Determination of the PRACH power for subframe i and the scaling rules for PUSCH transmit power may be based on the assumption that $P_{CMAX,c}(i)$ for the serving cell transmitting the PRACH is not greater than $P_{CMAX}(i)$. However, with the backoff of T-MPR applied to $P_{CMAX}(i)$ but not to $P_{CMAX,c}(i)$ of the serving cell transmitting the PRACH, this assumption may not necessarily be true. To compute $P_{PRACH}(i)$ for serving cell c while allowing for $P_{CMAX,c}(i)$ for said serving cell c being greater than $P_{CMAX}(i)$, the WTRU may determine PRACH and PUCCH power based on priority rules as follows.

For the case of a PRACH having higher priority than a PUCCH, the WTRU may determine the PRACH and PUCCH power as follows:

$$\hat{P}_{PRACH}(i)=\min(\hat{P}_{PRACH}(i),\hat{P}_{CMAX}(i)), \text{ and} \quad \text{Equation (46)}$$

$$\hat{P}_{PUCCH,j}(i)=\min(\hat{P}_{PUCCH,j}(i),(\hat{P}_{CMAX}(i)-\hat{P}_{PRACH}(i)). \quad \text{Equation (47)}$$

An alternative of equation (47) is:

$$\hat{P}_{PUCCH,j}(i)=\min(\hat{P}_{PUCCH,j}(i),(\hat{P}_{CMAX}(i)-a_{PRACH}(i)\cdot\hat{P}_{PRACH}(i))), \quad \text{Equation (48)}$$

where the factor $a_{PRACH}(i)$ may account for the length of the PRACH in subframe i being less than the entire subframe, depending on the PRACH preamble format. The factor may be, for example, the ratio of the length of the PRACH preamble in subframe i to the length of the subframe, or some other value $a'_{PRACH}(i)$, where $0<a_{PRACH}(i)<a_{PRACH}(i)<1$. For the case of subframe i not being the last subframe of a PRACH preamble format such as format 1, 2 or 3, the factor may be unity.

For the case of a PUCCH having a higher priority than a PRACH, the WTRU may determine the PUCCH and PRACH power as follows:

$$\hat{P}_{PUCCH}(i)=\min(\hat{P}_{PUCCH}(i),\hat{P}_{CMAX}(i)), \text{ and} \quad \text{Equation (49)}$$

$$\hat{P}_{PRACH}(i)=\min(\hat{P}_{PRACH}(i),(\hat{P}_{CMAX}(i)-\hat{P}_{PUCCH}(i))). \quad \text{Equation (50)}$$

In another embodiment, the WTRU may compute $P_{PRACH}(i)$ for serving cell c while allowing for $P_{CMAX,c}(i)$ for the serving cell c being greater than $P_{CMAX}(i)$. The WTRU may compute $P_{PRACH}(i)$ as follows:

$$P_{PRACH}(i)=\min(\min(P_{CMAX}(i),P_{CMAX,c}(i)),\text{PREAMBLE\_RECEIVED\_TARGET\_POWER}+PL_c) \quad \text{Equation (51)}$$

where $P_{CMAX,c}(i)$ may be the configured WTRU transmit power for subframe i of the primary cell and $PL_c$ may be the downlink pathloss estimate calculated in the WTRU for the primary cell.

If the total transmit power of the WTRU would or is to exceed $\hat{P}_{CMAX}(i)$, the WTRU may differently scale $\hat{P}_{PUSCH,c}(i)$ for the serving cell c in subframe i such that the following condition is satisfied:

$$\sum_c w(i)\cdot\hat{P}_{PUSCH,c}(i) \leq \quad \text{Equation (52)}$$
$$(\hat{P}_{CMAX}(i)-\hat{P}_{PUCCH}(i)-a_{PRACH}(i)\cdot\hat{P}_{PRACH}(i)).$$

Alternatively, $a_{PRACH}(i)$ may not be included. In case there is no PRACH transmission in subframe i, $\hat{P}_{PRACH}(i)=0$.

If the WTRU has a PUSCH transmission with UCI on serving cell j and a PUSCH transmission without UCI in any of the remaining serving cells, and the total transmit power of the WTRU would or is to exceed $\hat{P}_{CMAX}(i)$, the WTRU may differently scale $\hat{P}_{PUSCH,c}(i)$ for the serving cells without UCI in subframe i such that the following condition is satisfied:

$$\sum_{c\neq j} w(i)\cdot\hat{P}_{PUSCH,c}(i) \leq \quad \text{Equation (53)}$$
$$(\hat{P}_{CMAX}(i)-\hat{P}_{PUSCH,j}(i)-a_{PRACH}(i)\cdot\hat{P}_{PRACH}(i)).$$

$a_{PRACH}(i)$ may not be included, and in case there is no PRACH transmission in subframe i, $\hat{P}_{PRACH}(i)=0$.

If the WTRU has a simultaneous PUCCH and PUSCH transmission with UCI on serving cell j and a PUSCH transmission without UCI in any of the remaining serving cells, and the total transmit power of the WTRU would or is to exceed $P_{CMAX}(i)$, the WTRU may compute $\hat{P}_{PUSCH,c}(i)$ as follows:

$$\hat{P}_{PUSCH,j}(i) = \min(\hat{P}_{PUSCH,j}(i), \quad \text{Equation (54)}$$
$$(\hat{P}_{CMAX}(i)-\hat{P}_{PUCCH}(i)-a_{PRACH}(i)\cdot\hat{P}_{PRACH}(i))),$$

$$\sum_{c\neq j} w(i)\cdot\hat{P}_{PUSCH,c}(i) \leq (\hat{P}_{CMAX}(i)-\hat{P}_{PUCCH}(i)- \quad \text{Equation (55)}$$
$$a_{PRACH}(i)\cdot\hat{P}_{PRACH}(i)-\hat{P}_{PUSCH,j}(i)).$$

$a_{PRACH}(i)$ may not be included.

$P_{CMAXov}(i)$ may replace $P_{CMAX}(i)$ in the equations above. The linear equivalent of $P_{CMAXov}(i)$ may replace the linear equivalent of $P_{CMAX}(i)$ in the equations above.

A WTRU may report a power headroom to the eNB. The WTRU may include an indication in the power headroom report that non-zero T-MPR has been used. There may be one indication for the WTRU. Alternatively, there may be one indication per TAG or per CC or per CC with real headroom included in the report.

The WTRU may include $P_{CMAX}(i)$ in the power headroom report when the eNB may not be able to determine $P_{CMAX}(i)$ itself, (e.g., from other factors such as from the $P_{CMAX,c}(i)$ values included in the power headroom report).

The WTRU may include $P_{CMAX}(i)$ in the power headroom report when one or more of the following is true: (1) $P_{CMAX}(i)$ does not equal one or more of $P_{CMAX,c}(i)$ values included in the power headroom report for example for intra-band CA or contiguous intra-band CA; or (2) $P_{CMAX}(i)$ does not equal the sum of the $P_{CMAX,c}(i)$ values included in the power headroom report (e.g., the sum may be capped by $P_{PowerClass}$ for example for the case of inter-band CA or non-contiguous intra-band CA).

The WTRU may include in the power headroom report an indication that $P_{CMAX}(i)$ is included in the power headroom report.

The WTRU may trigger a power headroom report when the actual backoff due to overlap changes by more than a threshold. The trigger in a given subframe may require real UL transmission (e.g., PUSCH, PUCCH, or PRACH) in more than one TAG in that subframe. The trigger in a given subframe may require an overlap condition between two or more TAGs in that subframe. The overlap condition may require UL transmission (which may be one or more of PUSCH, PUCCH, or PRACH) in at least one TAG in the current subframe and at least one other TAG in the previous and/or next subframe. The starting subframe for comparison may be the most recent subframe in which a power headroom report was sent and the WTRU had real UL transmission in more than one TAG. The starting subframe for comparison may be the most recent subframe in which a power headroom report was sent and the WTRU had an overlap condition.

It should be noted that including $P_{CMAX}(i)$ in the power headroom report is not limited to the above cases related to the use of T-MPR.

In the above embodiments, $P_{CMAX}(i)$ may be replaced by $P_{CMAXov}(i)$ in one or more of the above power headroom reporting modifications.

In one embodiment, the WTRU may include $P_{CMAX}(i)$ in the power headroom report (for example in the subframe or TTI i in which the power headroom report is to be transmitted) if one or more of the following conditions is true:

$P_{CMAX}(i) \neq \Sigma p_{CMAX,c}(i)$ when $\Sigma p_{CMAX,c}(i) < p_{PowerClass}$; or $p_{CMAX}(i) \neq p_{PowerClass}$ when $\Sigma p_{CMAX,c}(i) >= p_{PowerClass}$.

A WTRU may not include $P_{CMAX}(i)$ in the power headroom report if one or more of the above conditions is not met.

In another embodiment, the WTRU may include $P_{CMAX}(i)$ in the power headroom report (for example in the subframe or TTI i in which the power headroom report is to be transmitted) if the following is true:

$p_{CMAX}(i) \neq \min[\Sigma p_{CMAX,c}(i), p_{PowerClass}]$.

A WTRU may not include $P_{CMAX}(i)$ in the power headroom report if this condition is not met.

The above embodiments may be applicable to inter-band CA and/or non-contiguous intra-band CA. The above embodiments may be applicable to a power headroom report in a subframe or TTI in which the WTRU has real UL transmissions for at least two CCs that are in at least one of different bands, different clusters, different TAGs, and the like.

$\Sigma p_{CMAX,c}(i)$ in the above conditions may be the sum of the $P_{CMAX,c}(i)$ values (or their linear equivalents) which may be one or more of the $P_{CMAX,c}(i)$ values included in the power headroom report, the $P_{CMAX,c}(i)$ values in the power headroom report for activated CCs with UL transmissions (which may include PUSCH and/or PUCCH transmissions and may not include PRACH and/or SRS transmissions) in the subframe (or TTI) of the power headroom report, (e.g., subframe or TTI i), or the $P_{CMAX,c}(i)$ values used in (e.g., used to cap) the power calculations of the channels of the activated CCs with UL transmissions (which may include PUSCH and/or PUCCH transmissions and may not include PRACH and/or SRS transmissions) in the subframe (or TTI) of the power headroom report (PHR), (e.g., subframe or TTI i).

For the case of the PCell which may have both a Type 1 and a Type 2 power headroom report, and may have a $P_{CMAX,c}(i)$ value associated with each, the $P_{CMAX,c}(i)$ value which may be used for the $P_{CMAX,c}$ sum (e.g., $\Sigma p_{CMAX,c}(i)$) may be one of the following: (1) the $P_{CMAX,c}(i)$ value transmitted in the power headroom report for the PCell if only one is transmitted, (2) the $P_{CMAX,c}(i)$ value associated with the Type 1 power headroom report if there is a PUSCH but no PUCCH transmission on the PCell in the subframe in which the power headroom report is to be transmitted, (3) the $P_{CMAX,c}(i)$ value associated with the Type 2 power headroom report if there is a PUCCH but no PUSCH transmission on the PCell in the subframe in which the power headroom report is to be transmitted, (4) the $P_{CMAX,c}(i)$ value associated with the Type 2 power headroom report if there are both PUCCH and PUSCH transmissions on the PCell in the subframe in which the power headroom report is to be transmitted, (alternatively, the $P_{CMAX,c}(i)$ value associated with the Type 1 power headroom report may be used), or (5) the $P_{CMAX,c}(i)$ value used for (e.g., used to cap) the power calculations for the channels of the PCell in the subframe in which the power headroom report is to be transmitted.

Instead of, or in addition to, applying a backoff to $P_{CMAX}(i)$, a backoff may be applied on a per TAG basis to serving cells within a TAG. The power backoff may be denoted as T-MPRs and may be applied to $P_{CMAX,c}(i)$ as follows:

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, P\text{-}MPR_c, T\text{-}MPR_c) - \Delta T_{C,c}\};$$ Equation (56)

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, T\text{-}MPR_c, P\text{-}MPR_c) - \Delta T_{C,c}\};$$ Equation (57)

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, P\text{-}MPR_c,) - T\text{-}MPR_c - \Delta T_{C,c}\};\text{ or}$$ Equation (58)

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c}, P\text{-}MPR_c,) - \Delta T_{C,c}\}; -T\text{-}MPR_c.$$ Equation (59)

In addition to the above, the following may be applied.

$$P_{CMAX\_H,c} = \text{MIN}\{P_{EMAX,c}, P_{PowerClass}, P_{PowerClass} - T\text{-}MPR_c\};$$ Equation (60)

$$P_{CMAX\_H,c} = \text{MIN}\{P_{EMAX,c}, P_{PowerClass} - T\text{-}MPR_c\};\text{ or}$$ Equation (61)

$$P_{CMAX\_H,c} = \text{MIN}\{P_{EMAX,c}, P_{PowerClass}\} - T\text{-}MPR_c.$$ Equation (62)

T-MPR may be applied to serving cells in the more advanced TAG, or applied to serving cells in the less advanced TAG.

T-MPR and/or T-MPRs, (e.g., backoff from $P_{PowerClass}$), may be applied for a short period of time, (for example, for the duration of SRS, for the duration of the overlap period between TAGs, or for the overlap period plus transient periods).

Figure 12:
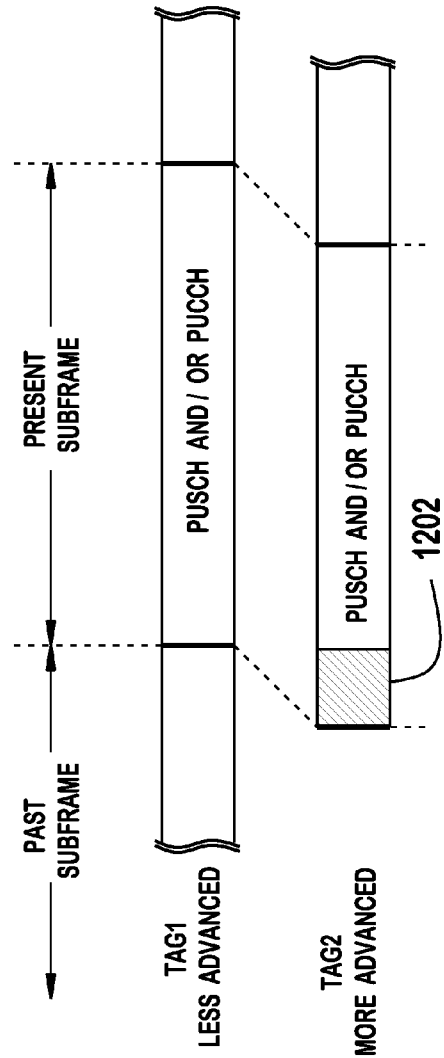
FIG. 12 shows an example of a guard symbol included in the present subframe in a more advanced CC.

The WTRU may create guard symbols between subframes to avoid overlapping channels, (e.g., in a present subframe in a more advanced TAG). The WTRU may puncture a PUSCH and/or shorten a PUCCH, and thus may not transmit a PUSCH and/or a PUCCH in that TAG, for example, for the first one or two symbols of the present subframe. FIG. 12 shows an example of a guard symbol 1202 included in the present subframe in a more advanced CC.

Guard symbols may be used if any condition disclosed above for dropping the SRS in an overlapping region is satisfied. Alternatively or additionally, the WTRU may include the guard symbols when there is a transmission in the less advanced TAG in the past subframe and a transmission in the more advanced TAG in the present subframe, and/or if the sum of transmit powers would or is to exceed $P_{CMAX}(i)$ for the present subframe.

The guard symbols may be the first and last symbols of a subframe in an SCell in an sTAG. Alternatively, the guard symbols may be the first symbol of a subframe in an SCell in an sTAG if there is a transmission in the PCell or any SCell in the pTAG in the previous subframe that uses, or is scheduled to use, the last symbol of that subframe. An example of a transmission that is scheduled to use, but does not use, the last symbol in a subframe is an SRS that is not transmitted, for example, due to transmit power constraint. Alternatively, the guard symbol may be the last symbol of a subframe in an SCell in an sTAG if there is a transmission in the PCell or any SCell in the pTAG in the next subframe. In these cases, the WTRU and/or the eNB may not need to know or determine which CC or TAG is more or less advanced.

For constant PRACH power over the entire PRACH preamble, a PRACH preamble transmission power, $P_{PRACH}$, may be determined as follows:

$$P_{PRACH} = \min\{P_{CMAX,c}(j), \text{PREAMBLE\_RECEIVED\_TARGET\_POWER} + PL_c\}, \quad \text{Equation (63)}$$

where subframe j may be the first subframe of the preamble, $P_{CMAX,c}(j)$ may be the configured WTRU transmit power for subframe j of serving cell c and $PL_c$ may be the downlink pathloss estimate calculated in the WTRU for serving cell c. $P_{PRACH}$ may be in dBm.

Equation (63) may be expressed as follows:

$$P_{PRACH}(i) = \min\{P_{CMAX,c}(j), \text{PREAMBLE\_RECEIVED\_TARGET\_POWER} + PL_c\}, \quad \text{Equation (64)}$$

where subframe i may be any subframe of the preamble, j may be the first subframe of the preamble, $P_{CMAX,c}(j)$ may be the configured WTRU transmit power for subframe j of the serving cell c, and $PL_c$ may be the downlink pathloss estimate calculated in the WTRU for the serving cell c. $P_{PRACH}(i)$ may be in dBm.

After determining $P_{PRACH}$ or $P_{PRACH}(i)$, additional processing may be performed to allow for $P_{CMAX} < P_{CMAX,c}$, which may be expressed (e.g., in linear form for $P_{PRACH}(i)$) as follows:

$$\hat{P}_{PRACH}(i) = \min(\hat{P}_{PRACH}(i), \hat{P}_{CMAX}(j)), \text{ or} \quad \text{Equation (65)}$$

$$\hat{P}_{PRACH} = \min(\hat{P}_{PRACH}, \hat{P}_{CMAX}(j)), \quad \text{Equation (66)}$$

where subframe j may be the first subframe of the PRACH preamble.

In addition, to allow for the case of $\hat{P}_{PRACH}$ being greater than $\hat{P}_{CMAX}(i)$, in any equation where, amongst other channel power terms, $\hat{P}_{PRACH}$ or $\hat{P}_{PRACH}(i)$ is subtracted from $\hat{P}_{CMAX}(i)$, the subtraction may be modified to prevent the computation of a negative linear power term as, for example, $\max(0, \hat{P}_{CMAX}(i) - \hat{P}_{PRACH})$ or $\max(0, \hat{P}_{CMAX}(i) - \hat{P}_{PRACH}(i))$.

Figure 13:
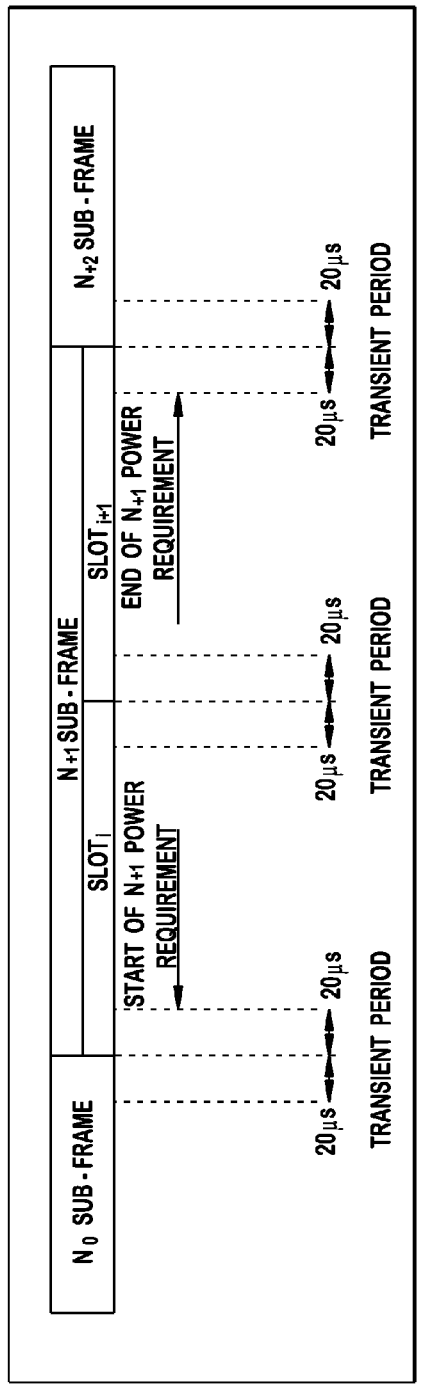
FIGS. 13 and 14 show examples of transient periods without SRS and with SRS, respectively.
Figure 14:
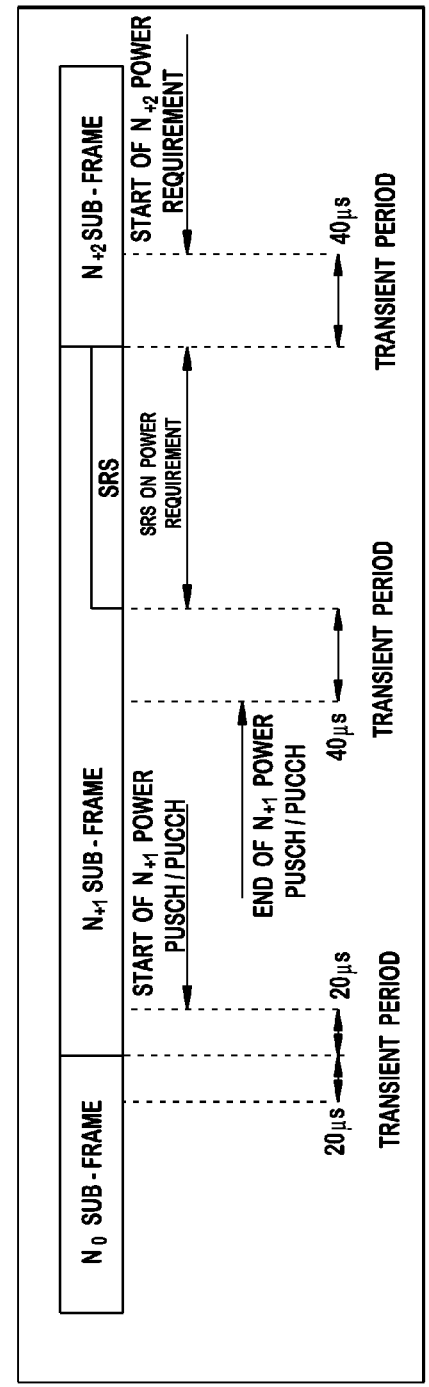

There may be transient periods at the start and/or the end of subframes, during which the subframe's power requirement may not apply. Examples of such transient periods without SRS and with SRS are shown in FIGS. 13 and 14, respectively.

Figure 15:
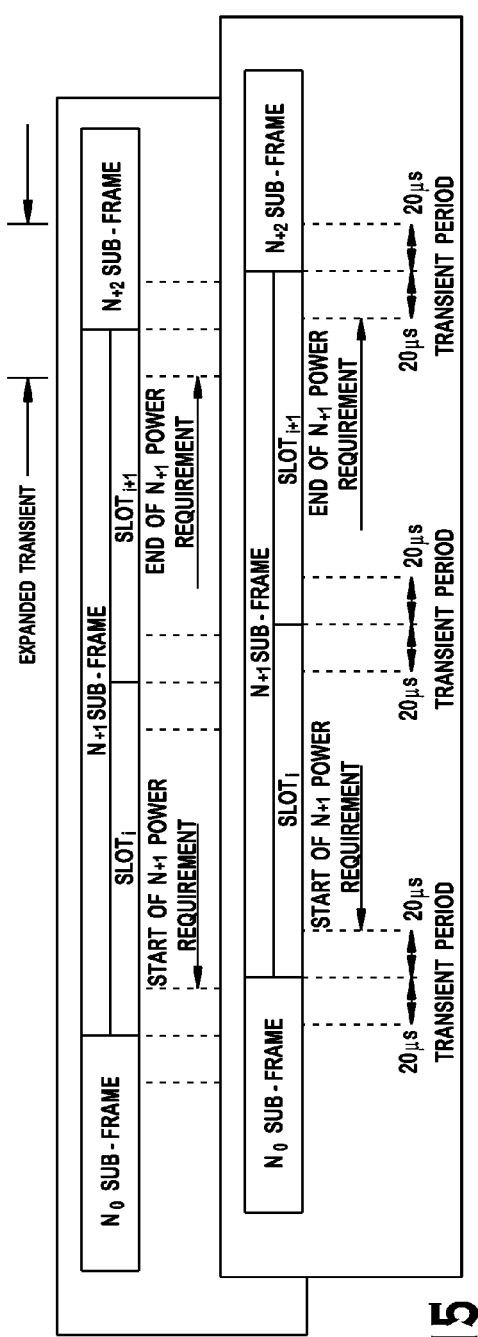
FIGS. 15 and 16 show examples of expanded transient periods for non-SRS and SRS transmissions, respectively.
Figure 16:
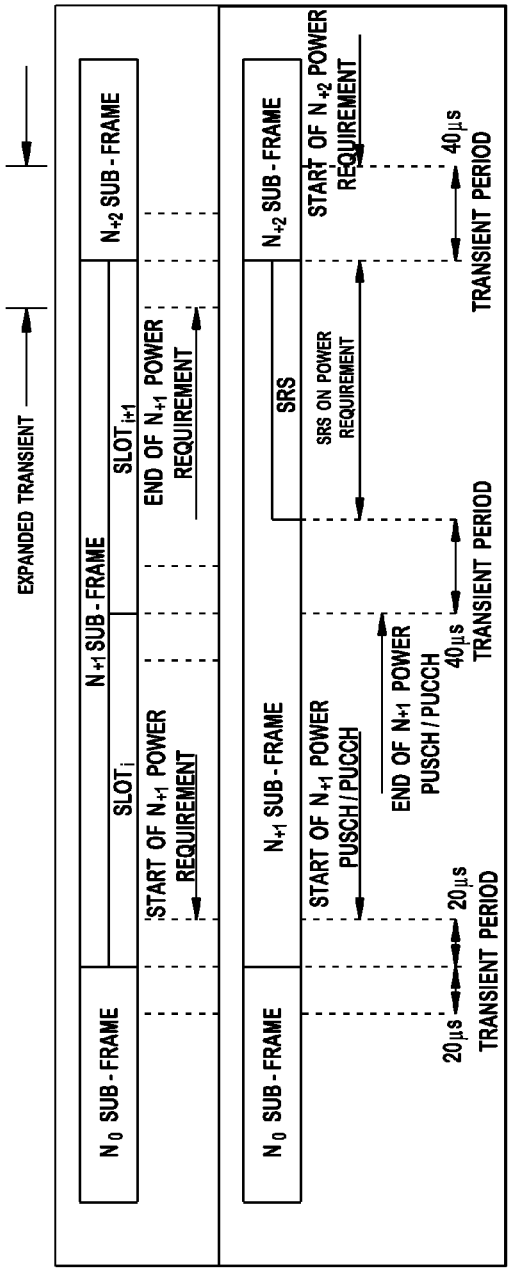

In one embodiment, the transient periods, (e.g., between slots and/or subframes), may be expanded. The transients periods may be expanded if the TA difference (e.g., between UL transmissions on different CCs) is beyond a fixed threshold, a signaled threshold, or with no threshold test (e.g., unconditionally in the case of inter-band operation). FIGS. 15 and 16 show examples of expanded transient periods for non-SRS and SRS transmissions, respectively.

Embodiments for applying per-symbol scaling are disclosed hereafter. The per-symbol scaling may be applied after the conventional scaling for $P_{CMAX}(i)$ has been applied.

The eNB may need to know that the WTRU is applying the per-symbol scaling. The embodiments disclosed above for an eNB to know that the WTRU is applying the rules for dropping SRS may be employed for this purpose. The per-symbol scaling may be applied when there are two or more TAGs, regardless of their TA difference.

In one embodiment, for per-symbol scaling, all symbols in the overlap may be scaled by the same factor. The factor may be known to both the WTRU and the eNB. The factor may be a function of the number of CCs in the overlap. The number of CCs may be the number of configured CCs, the number of activated CCs, or the number of CCs with grants in the affected subframes. For the case of shortened subframes or formats, the number of CCs may be the respective number of CCs with transmitted symbols in the overlap. This may be limited to the number of CCs per any of these definitions using quadrature amplitude modulation (QAM).

Figure 17:
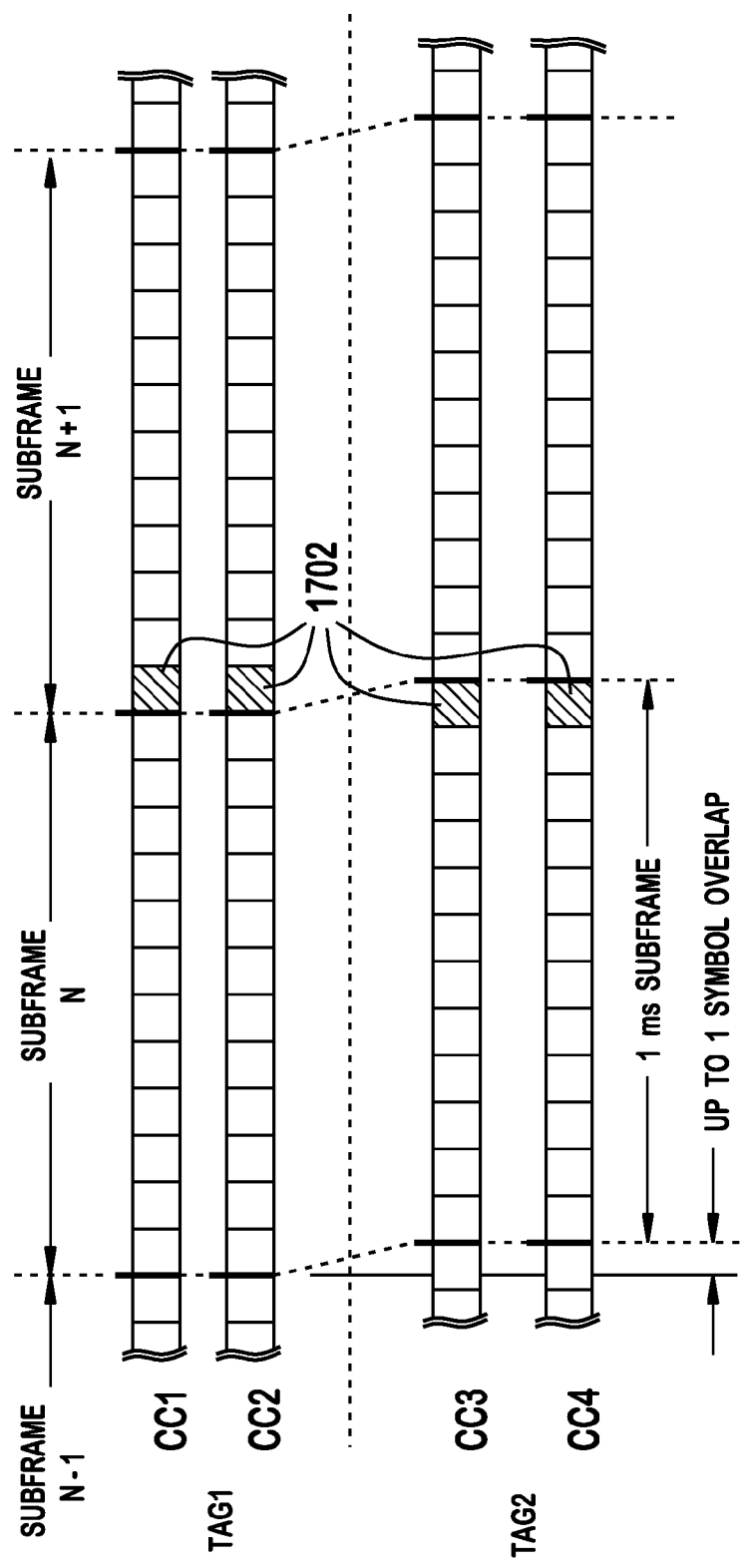
FIG. 17 shows an example in which per-symbol scaling is applied to the symbols in the overlap.

The per-symbol scale factor may be 1/K, where K is the number of CCs described above. The symbols in the overlapping portion, (e.g., the last symbol of a subframe in a less advanced TAG and the first symbol of the next subframe in a more advanced TAG), may have its power scaled by 1/K. FIG. 17 shows an example in which per-symbol scaling is applied to the symbols in the overlap. In this example, two CCs in TAG1 (the more advanced TAG) and two CCs in TAG2 (the less advanced TAG) are shown and symbols 1702 are the symbols to which per-symbol scaling is applied.

Alternatively, a scale factor α/K may be used, where α may be a constant, which may be signaled by the WTRU to the eNB, signaled by the eNB to the WTRU, a specified function of a signaled value(s), or specified. α may be in the range 1≤α≤K.

In addition to applying the per-symbol scaling as described above, for example to manage the average power of each CC such that it may be the same before and after applying the per-symbol scaling to the symbols in the overlapping portion, the power of the remaining symbols in the subframe may be scaled by a different factor. For example, the symbols in the overlapping portion and the remaining symbols may be scaled by $f_1$ and $f_2$, respectively, where:

$$f_1 = \frac{2N_{symb}^{UL}}{1 + K(2N_{symb}^{UL} - 1)} \quad \text{Equation (67)}$$

$$f_2 = \frac{K \cdot 2N_{symb}^{UL}}{1 + K(2N_{symb}^{UL} - 1)},$$

where $N_{symb}^{UL}$ is the number of SC-FDMA symbols in a slot of the subframe, which may be 6 or 7.

An example of using two scaling factors, $f_1$ (which may be used to scale the symbols in the overlapping portion) and $f_2$ (which may be used to scale the remaining symbols), including the constant α is as follows:

$$f_1 = \frac{2N_{symb}^{UL}}{1+(K/\alpha)(2N_{symb}^{UL}-1)} = \frac{\alpha \cdot 2N_{symb}^{UL}}{\alpha + K \cdot (2N_{symb}^{UL}-1)} \quad \text{Equation (68)}$$

$$f_2 = \frac{(K/\alpha) \cdot 2N_{symb}^{UL}}{1+(K/\alpha)(2N_{symb}^{UL}-1)} = \frac{K \cdot 2N_{symb}^{UL}}{\alpha + K \cdot (2N_{symb}^{UL}-1)}.$$

Alternatively, for per-symbol scaling, the first or last symbol in a subframe (or another subset of the symbols in the subframe which may be a fixed subset or a subset dependent on the overlap) may be scaled by the factor $f_1$ and the remaining symbols may not be scaled because, for example, the factor $f_2$ may be so close to unity for practical combinations of $\alpha$, K, and $N_{symb}^{UL}$ so that that difference may be ignored.

The embodiments above for per-symbol scaling may be limited to CCs using QAM in the respective overlaps.

A power scale factor may be applied to the first and last symbols of CCs in a TAG when there is a transmission in more than one TAG. Alternatively, a power scale factor may be applied to the first and last symbols of CCs in a TAG when there was any transmission in another TAG in the last symbol of the previous subframe and/or will be any transmission in another TAG in the first symbol of the next subframe. Alternatively, a power scale factor may be applied to the first symbol of CCs in a TAG when there was any transmission in another TAG in the last symbol of the previous subframe, and a power scale factor may be applied to the last symbol of CCs in a TAG if there will be any transmission in another TAG in the first symbol of the next subframe. In these embodiments, the per-symbol scaling may be applied regardless of which TAG is more or less advanced.

In a case where a power scale factor, (e.g., $f_{12}$), is applied to both the first and last symbols, the power of the remaining symbols in the subframe may also be scaled by a different power scale factor, (e.g., $f_{22}$), for example to maintain the average power of each CC the same before and after applying the power scaling to the first and last symbols. The first subscript means the symbols in the overlap or the remaining symbols as in the above, and the second subscript means the two-symbol case.

$$f_{12} = \frac{2N_{symb}^{UL}}{2+K(2N_{symb}^{UL}-2)} \quad \text{Equation (69)}$$

$$f_{22} = \frac{K \cdot 2N_{symb}^{UL}}{2+K(2N_{symb}^{UL}-2)}.$$

The two power scaling factors including the constant $\alpha$ may be written as follows:

$$f_{12} = \frac{2N_{symb}^{UL}}{2+(K/\alpha)(2N_{symb}^{UL}-2)} = \frac{\alpha \cdot 2N_{symb}^{UL}}{2\alpha + K \cdot (2N_{symb}^{UL}-2)} \quad \text{Equation (70)}$$

$$f_{22} = \frac{(K/\alpha) \cdot 2N_{symb}^{UL}}{2+(K/\alpha)(2N_{symb}^{UL}-2)} = \frac{K \cdot 2N_{symb}^{UL}}{2\alpha + K \cdot (2N_{symb}^{UL}-2)}.$$

The above embodiments may be extended for the case of K being different for the first and last symbols of the subframe, denoted as $K_1$ and $K_{2N}$, respectively. In this case the power scale factors may be, for example, as follows:

$$f_{13} = \frac{K_{2N} 2N_{symb}^{UL}}{K_1 + K_{2N} + K_1 K_{2N} \cdot (2N_{symb}^{UL}-2)} \quad \text{Equation (71)}$$

$$f_{23} = \frac{K_1 K_{2N} 2N_{symb}^{UL}}{K_1 + K_{2N} + K_1 K_{2N} \cdot (2N_{symb}^{UL}-2)}$$

$$f_{33} = \frac{K_1 2N_{symb}^{UL}}{K_1 + K_{2N} + K_1 K_{2N} \cdot (2N_{symb}^{UL}-2)},$$

where $f_{13}$ may be the power scale factor applied to the first symbol in the subframe, $f_{33}$ may be the power scale factor applied to the last symbol in the subframe, and $f_{23}$ may be the power scale factor applied to the remaining symbols in the subframe. The parameters $K_1$ and $K_{2N}$, may be replaced with $K_1/\alpha$ and $K_{2N}/\alpha$, respectively.

The per-symbol scaling may be applied conditionally, for example, when there is more than one TAG, or when there is a particular type of transmission in a subframe, (e.g., 16-QAM or 64-QAM).

The per-symbol scaling may be applied in a manner to avoid unnecessary scaling when there is a scheduled SRS transmission. For example, where one scale factor, 1/K, is used, if there is a 64-QAM transmission in any cell in subframe N, and if in a different TAG there was a PUCCH and/or PUSCH transmitted in the last symbol in subframe N−1, the WTRU may scale the power of that first symbol of channels transmitted in subframe N by 1/K, and if there is a 64-QAM transmission in any cell in the last symbol in subframe N and in a different TAG there will be transmission in the first symbol in subframe N+1, the WTRU may scale the power of that last symbol of PUCCH and/or PUSCH transmitted in subframe N by 1/K.

A compensating factor may be included in determining $P_{PUCCH}$, and/or $P_{PUSCH}$ with UCI, for example to compensate for a small loss incurred by the per-symbol scaling as follows:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) + x \end{array} \right\}, \quad \text{Equation (72)}$$

$$P_{PUSCH,c}(i) = \min\left\{ \begin{array}{l} P_{CMAX,c}(i), \\ 10\log_{10}(M_{PUSCH,c}(i)) + P_{0\_PUSCH,c}(j) + \alpha_c(j) \cdot PL_c + \Delta_{TF,c}(i) + f_c(i) + x \end{array} \right\}, \quad \text{Equation (73)}$$

where x is the compensating factor. The compensating factor may be a fixed amount, or a function of the $P_{PUCCH}$ and or $P_{PUSCH}$, or a function of the amount of overlap, and may be applied when scaling is performed to avoid exceeding $P_{CMAX}$ in the overlap. The compensating factor may be a certain value when per-symbol scaling is performed and may be 0 dB if per-symbol scaling is not performed.

Embodiments for handling maximum power during an overlap are disclosed hereafter.

In certain embodiments, a transmit power may be determined for subframe N and may include scaling. Before transmission, and possibly allowing time for the additional processing described below, a transmit power may be determined for subframe N+1 and may include scaling.

Figure 18A:
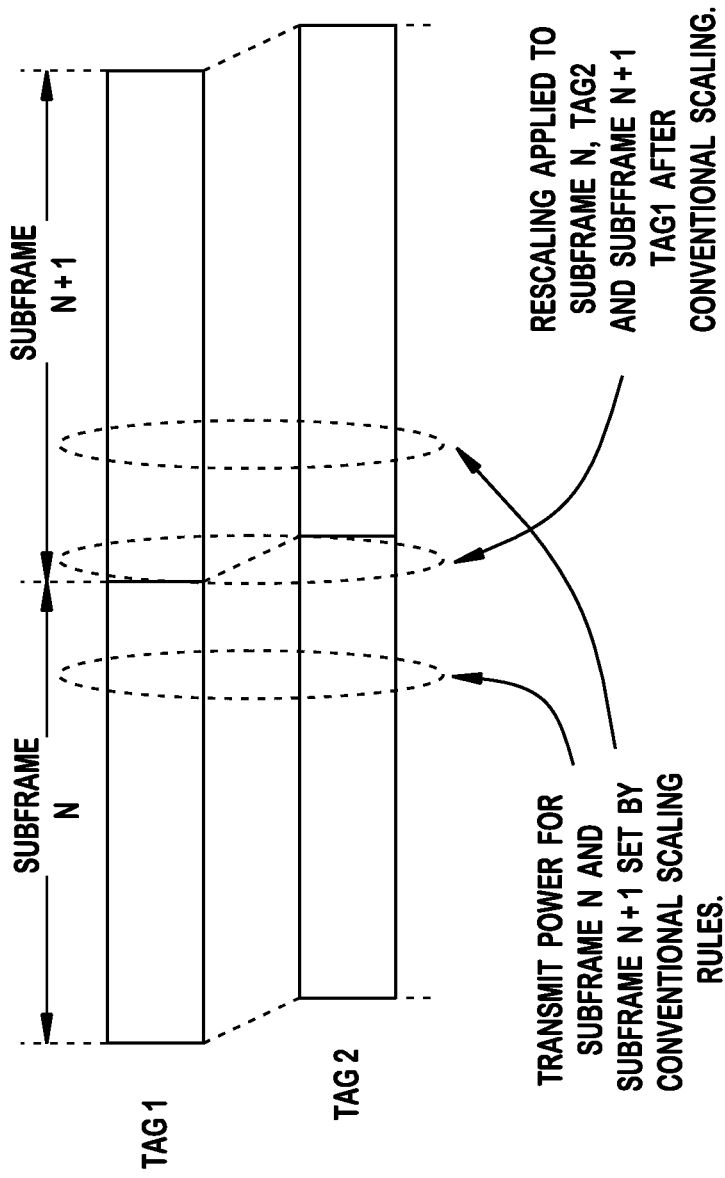
FIG. 18A shows an example in which transmit powers in the overlap are rescaled after the power is determined for the two adjacent subframes.

Following, or in addition to, the above processing for subframes N and N+1, the WTRU may scale, further scale, rescale, or adjust the transmission or the transmit power of channels in the overlapping portion, which may be in the more advanced TAG in subframe N+1 and the less advanced TAG in subframe N, for example to avoid exceeding a maximum power during the overlap. FIG. 18A shows an example in which the transmit powers in the overlap are rescaled after the power is determined for the two adjacent subframes. The transmit power for subframe N and subframe N+1 may be set by the conventional scaling rules, and rescaling may be applied to subframe N in the less advanced TAG (TAG2 in this example) and subframe N+1 in more advanced TAG (TAG1 in this example) for example to avoid exceeding a maximum power during the overlap.

The scaling, rescaling, or adjusting may be applied, (e.g., using the conventional scaling priorities), as follows, with i and i+1 replacing N and N+1 (where limiting the power may be to the quantity $P_{CMAX\_ov}(i)$):

$$w(i) \cdot (\hat{P}_{PUCCH}(i, TAG2) + \hat{P}_{PUCCH}(i+1, TAG1)) \leq \quad \text{Equation (74)}$$
$$\hat{P}_{CMAX\_ov}(i) - \hat{P}_{PRACH}(i+1, TAG1),$$

$$w(i) \cdot \left( \sum_{c=j} \hat{P}_{PUSCH,c}(i, TAG2) + \sum_{c=j} \hat{P}_{PUSCH,c}(i+1, TAG1) \right) \leq \quad \text{Equation (75)}$$
$$\hat{P}_{CMAX\_ov}(i) - \hat{P}_{PRACH}(i+1, TAG1) -$$
$$\hat{P}_{PUCCH}(i, TAG2) - \hat{P}_{PUCCH}(i+1, TAG1),$$

$$w(i) \cdot \left( \sum_{c \neq j} \hat{P}_{PUSCH,c}(i, TAG2) + \sum_{c \neq j} \hat{P}_{PUSCH,c}(i+1, TAG1) \right) \leq \quad \text{Equation (76)}$$
$$\hat{P}_{CMAX\_ov}(i) - \hat{P}_{PRACH}(i+1, TAG1) -$$
$$\hat{P}_{PUCCH}(i, TAG2) - \hat{P}_{PUCCH}(i+1, TAG1) -$$
$$\sum_{c=j} \hat{P}_{PUSCH,c}(i, TAG2) - \sum_{c=j} \hat{P}_{PUSCH,c}(i+1, TAG1),$$

where $\hat{P}_X(i, TAGy)$ may be the linear form of transmit power in channel X, (e.g., X=PUCCH), in subframe i, in TAG y. TAG1 is more advanced than TAG2, (e.g., for any given subframe, channels in TAG1 are transmitted earlier by the WTRU than are channels in TAG2). The numbering of the TAGs is for example purposes. j may be a serving cell that has PUSCH transmission with UCI.

In certain embodiments, $P_{CMAX\_ov}(i)$ may be the power limit (e.g., the maximum power) for the WTRU for the sum of the powers of the channels in the overlap of subframes i and i+1 or the power limit (e.g., the maximum power) for the WTRU for the sum of the powers of the CCs in the overlap of subframes i and i+1. $P_{CMAX\_ov}(i)$ (or in linear form $\hat{P}_{CMAX\_ov}(i)$), may be a function of $P_{CMAX}(i)$ and/or $P_{CMAX}(i+1)$ (or $\hat{P}_{CMAX}(i)$ and/or $\hat{P}_{CMAX}(i+1)$) for example, $\alpha \cdot \min$ ($\hat{P}_{CMAX}(i), \hat{P}_{CMAX}(i+1)$), wherein $\alpha$ may be 1. Alternatively, it may be a function of $\hat{P}_{CMAX}(i)$ and $\hat{P}_{CMAX}(i+1)$ that takes into account the amount of the overlap. $\alpha$ may be a constant and may be the $\alpha$ disclosed above for per-symbol scaling.

Linear power quantities to the right of the inequalities in the above equations may be after scaling has been applied in the previous step.

As an alternative to using the conventional scaling priorities for rescaling, the channels in subframe N in TAG2 and the channels in subframe N+1 in TAG1 may be rescaled equally.

As an alternative to rescaling only the channels in subframe N in TAG2 and the channels in subframe N+1 in TAG1, the channels in subframe N and subframe N+1 may be rescaled.

In certain embodiments, a WTRU may determine the power(s) for the channel(s) in subframe N and N+1 ignoring the overlap and may use those powers for the channel(s) in the non-overlapping parts of subframes N and N+1, respectively. The WTRU may determine the powers for the channels in the overlap and use those powers for the channels in the overlap. For example, a WTRU may scale the channels in the non-overlapping regions separately from the overlapping region(s) instead of scaling for the entire subframe and then rescaling or adjusting in the overlap. The WTRU may use the same individual channel powers before scaling for the overlap and non-overlap regions and these channel powers may be determined by the WTRU as if the overlap did not exist.

The WTRU may scale or otherwise adjust the powers of the channels in the overlap of subframes N and N+1 to not exceed a maximum output power for the overlap, e.g., $P_{CMAX\_ov}(N)$ (or $P_{CMAX\_ov}(i)$ using the "i" notation) which may also be referred to as $P_{CMAX\_ov}$.

Figure 18B:
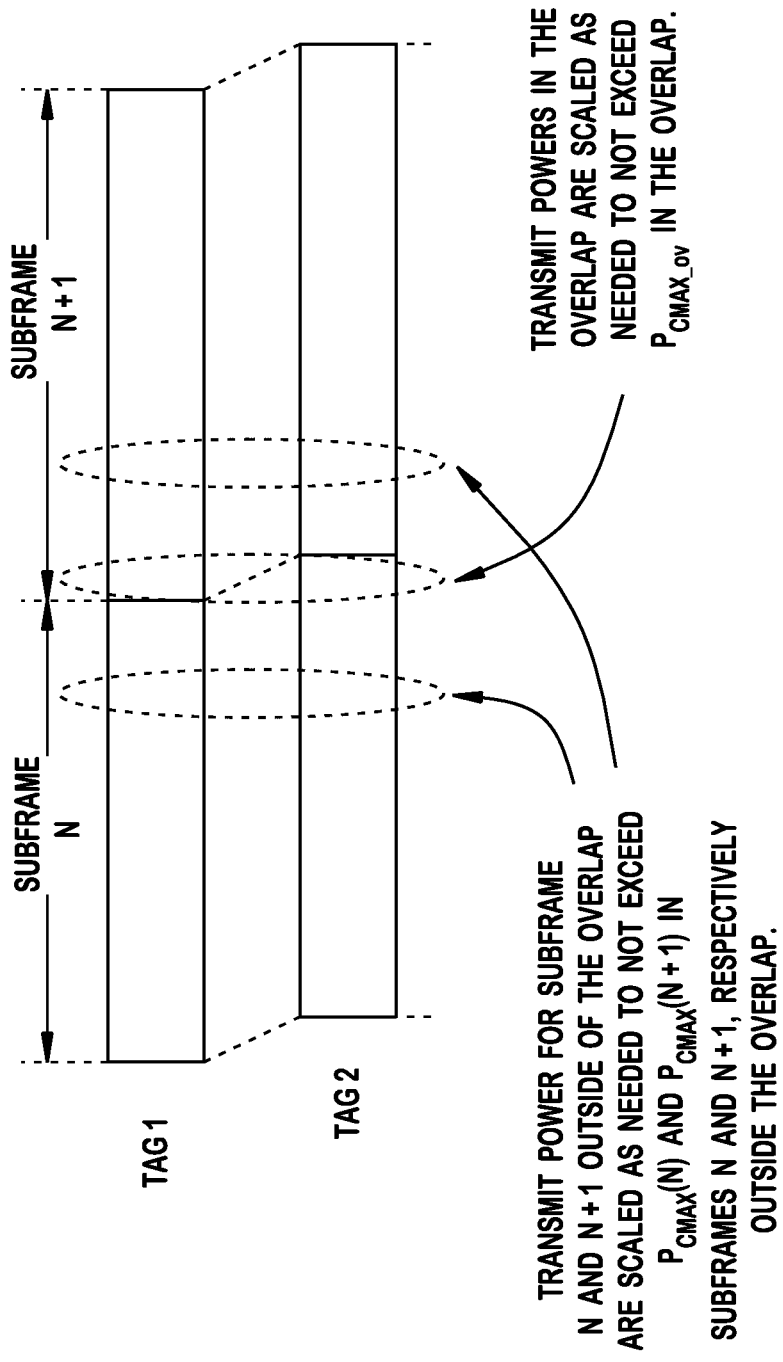
FIG. 18B shows an example in which the transmit powers in the overlap are scaled separately from the transmit powers in the non-overlapping regions.

FIG. 18B shows an example in which the transmit powers in the overlap are scaled separately from the transmit powers in the non-overlapping regions and the transmit powers in the overlap are scaled as needed to not exceed $P_{CMAX\_ov}$. Transmit powers for subframe N and N+1 outside of the overlap are scaled as needed to not exceed $P_{CMAX}(N)$ and $P_{CMAX}(N+1)$ in subframes N and N+1, respectively, outside of the overlap. Transmit powers in the overlap are scaled as needed to not exceed $P_{CMAX\_ov}$ in the overlap. It is noted that scaling is an example and any actions may be taken, such as adjusting power or dropping channels, to not exceed $P_{CMAX\_ov}$ in the overlap or to not exceed $P_{CMAX}(N)$ and/or $P_{CMAX}(N+1)$ in subframes N and N+1, respectively, outside of the overlap and still be consistent with the embodiments disclosed herein.

Taking actions (e.g., scaling or adjusting power or dropping channels) and/or making the related decisions for those actions (e.g., determining whether a maximum power would be or is to be exceeded) separately for the channels or transmit powers in the non-overlapping regions and the channels or transmit powers in the overlap is an example and the actions may be taken and the decisions may be made separately or together and may be taken or made in any order to not exceed $P_{CMAX\_ov}$ in the overlap or to not exceed $P_{CMAX}(N)$ and/or $P_{CMAX}(N+1)$ in subframes N and N+1, respectively, outside of the overlap and still be consistent with the embodiments disclosed herein. Decisions or determinations such as those regarding whether a maximum power would be or is to be exceeded as well as any related actions may be performed using values, sums and comparisons in linear or log form.

$P_{CMAX\_ov}(i)$ may be a configured value which may be chosen by the WTRU. It may be defined to have a range with a high value (e.g., $P_{CMAX\_ov\_H}(i)$) and a low value (e.g., $P_{CMAX\_ov\_L}(i)$) and/or it may be defined to have one value. If defined to have a range, the WTRU may choose a value in that range for $P_{CMAX\_ov}(i)$. For the overlap, the WTRU may not be permitted to exceed the power of its chosen value (e.g., in case of a range), the high value, or the single value. $P_{CMAX\_ov}(i)$, $P_{CMAX\_ov\_H}(i)$, and $P_{CMAX\_ov\_L}(i)$ may correspond to (e.g., be applicable to) the overlap between subframe i and i+1.

$P_{CMAX\_ov}(i)$ or $P_{CMAX\_ov\_H}(i)$ may be at least one of the following: $P_{PowerClass}$ or the smaller of the sum of the $P_{EMAX,c}$ values of the CCs in the overlap and $P_{PowerClass}$, (e.g., MIN$\{10 \log_{10} \Sigma p_{EMAX,c}, P_{PowerClass}\}$). The values, sums and comparisons may be in linear or log form.

$P_{CMAX\_ov\_L}(i)$ may be at least one of the following where values, sums and comparisons may be in linear and/or log form. $P_{CMAX\_ov\_L}(i)$ may be a function of the $P_{CMAX\_L\_CA}$ values for subframes i and/or i+1 such as one of the two values or the minimum of the two values, (e.g., MIN$\{P_{CMAX\_L\_CA}(i), P_{CMAX\_L\_CA}(i+1)\}$).

$P_{CMAX\_ov\_L}(i)$ may be a function of the $P_{CMAX\_L,c}$ values for the CCs transmitted in subframe i and/or i+1, for example the sum of the $P_{CMAX\_L,c}$ value(s) in subframe i for the less advanced CC(s) plus the sum of the $P_{CMAX\_L,c}$ value(s) in subframe i+1 of the more advanced CC(s) where such total may be capped by $P_{PowerClass}$, for example, as follows:

$$P_{CMAX\_ov\_L}(i) = \text{MIN}[10 \log 10(\text{sum}(p_{CMAX\_L,c}(k))), P_{PowerClass}], \quad \text{Equation (77)}$$

where k=i for the CC(s) in the TAG that is less advanced and k=i+1 for the CC(s) in the TAG that is more advanced. For example, for the case of 2 CCs (c0 and c1), it may be that in the equation above, k=i for c=c0 and i+1 for c=c1, where c0 is the carrier in the TAG that is less advanced than that of c1, and c1 is the carrier in the TAG that is more advanced than that of c0.

In another example:

$$P_{CMAX\_ov\_L}(i) = \text{MIN}[10 \log 10(\text{sum}(\text{MIN}[p_{EMAX,c}(k)/\Delta t_{C,c}(k), P_{PowerClass}/(mpr_c(k) \cdot a \cdot mpr_c(k) \cdot \Delta t_{C,c}(k) \cdot \Delta t_{IB,c}(k), p_{PowerClass}/(pmpr_c(k) \cdot \Delta t_{C,c}(k)])), P_{PowerClass}], \quad \text{Equation (78)}$$

where, for example for 2 CCs (c0 and c1), it may be that k=i for c=c0 and i+1 for c=c1, c0 is the carrier in the TAG that is less advanced than that of c1, and c1 is the carrier in the TAG that is more advanced than that of c0.

$P_{CMAX\_ov\_L}(i)$ may be a function of the $P_{CMAX\_L,c}$ values for the CCs transmitted in subframe i and/or i+1, for example the sum of the lower $P_{CMAX\_L,c}$ value (from subframe i or i+1) for each CC that may overlap where such sum may be capped by $P_{PowerClass}$. For example, $P_{CMAX\_ov\_L}(i)$ may be represented as:

$$P_{CMAX\_ov\_L}(i) = \text{MIN}[10 \log 10(\text{sum}(\text{MIN}[p_{CMAX\_L,c}(i), p_{CMAX\_L,c}(i+1)])), P_{PowerClass}]. \quad \text{Equation (79)}$$

$P_{CMAX\_ov\_L}(i)$ may be a function of the $P_{CMAX\_L,c}$ values for the CCs transmitted in subframe i and/or i+1, for example K×the lowest $P_{CMAX\_L,c}$ value (from subframe i or i+1) among the CCs that may overlap, where K is the number of CCs that may overlap and the resulting value may be capped by $P_{PowerClass}$.

For example for 2 CCs, c0 and c1:

$$P_{CMAX\_ov\_L}(i) = \text{MIN}[10 \log 10(2 \times \text{MIN}[p_{CMAX\_L,c0}(i), p_{CMAX\_L,c0}(i+1), p_{CMAX\_L,c1}(i), p_{CMAX\_L,c1}(i+1)]), P_{PowerClass}]. \quad \text{Equation (80)}$$

Which embodiment is used for determining $P_{CMAX\_ov}(i)$ may be based on at least whether the overlapping CCs are intra-band or inter-band.

The subframe region or time which may be considered the overlap region, for example the region of the subframes(s) to which $P_{CMAX\_ov}(i)$ may apply and/or to which rules, such as scaling or transmission rules for overlap may apply may be defined based on the UL timing of the start and end of each subframe for each CC or each TAG or one or more CCs in each TAG. FIG. 19 shows an example overlap region based on UL timing. In FIG. 19, the section 1902 with the diagonal hatching may be considered the overlap region for these CCs or TAGs.

It should be noted that there may be a transient region defined for each CC which may begin before what is considered the actual start of the subframe and/or which may end after what is considered the actual end of the subframe. This transient region may allow for the power to change from one subframe to another and/or may be a region of the subframe not included in power testing. Since the power of a CC may change during the transient region, there may be the possibility of exceeding a power limit in that region.

In one embodiment, what is to be considered the overlap region, (for example for applying the embodiments for handling maximum power during overlap), may include (e.g., also include) the transient regions which may be at the beginning and/or end of each subframe. FIG. 20 shows an example of transient regions at the end of subframe i of the more advanced TAG (TAG2) and at the beginning of subframe i+1 of the less advanced TAG (TAG1). As shown in FIG. 20, the transient regions before the beginning and after the end of each subframe may be included in the region considered to overlap, e.g., based on UL subframe timing.

The measured maximum output power $P_{UMAX}$ over serving cells may be within the following range:

$$P_{CMAX\_L\_CA} - T(P_{CMAX\_L\_CA}) \leq P_{UMAX} \leq P_{CMAX\_H\_CA} + T(P_{CMAX\_H\_CA}), \quad \text{Equation (81)}$$

where T(P) represents a tolerance value for power P.

An allowance for the overlapping transmissions when there are multiple timing advances or multiple TAGs may be made by changing the tolerance of $P_{UMAX}$, $T(P_{CMAX})$. Such allowance may be applicable when there is more than one TAG, or when there is more than one TAG and the timing difference between TAGs is greater than a threshold. The allowance may be an increase or a decrease by some amount, for example, a fixed amount (e.g., +0.5 dB), a fixed amount that is a function of $P_{CMAX}$, an amount or amounts that is/are a function of other quantities signaled by the eNB, a new quantity or quantities signaled by the eNB, and/or a function or functions thereof.

The tolerance change (which may be an addition or subtraction) may be applicable to one or more of the lower and upper limits of $P_{UMAX}$. For the case in which T-MPR is not included in $P_{CMAX\_L\_CA}$, or other cases, an additional tolerance may be subtracted from the left side of equation (81) when there is an overlap condition in a subframe as follows:

$$P_{CMAX\_L\_CA} - T(P_{CMAX\_L\_CA}) - \text{Toverlap} \leq P_{UMAX} \leq P_{CMAX\_H\_CA} + 4T(P_{CMAX\_H\_CA}), \quad \text{Equation (82)}$$

where Toverlap may be equal to T-MPR or a function of T-MPR.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for power control for wireless transmissions on multiple component carriers associated with multiple timing advances, the method comprising:
 a wireless transmit/receive unit (WTRU) calculating a transmit power of physical channels in each subframe to be transmitted on a plurality of component carriers that belong to at least two different timing advance groups (TAGs), wherein each TAG is associated with a separate timing advance value for uplink transmissions;
 the WTRU scaling a transmit power of at least one of the physical channels in each subframe on a condition that a sum of a transmit power of the physical channels in the same subframe is to exceed a configured maximum WTRU output power for that subframe; and
 the WTRU adjusting the transmit power of at least one of the physical channels on a condition that a sum of a transmit power of the physical channels in an overlapping portion of a subframe of a less advanced TAG and a next subframe of a more advanced TAG is to exceed a configured maximum WTRU output power for the overlapping portion such that a sum of a transmit power of the physical channels in the overlapping portion does not exceed the configured maximum WTRU output power for the overlapping portion.

2. The method of claim 1 wherein the transmit power of the physical channels is adjusted in an order based on a physical channel priority.

3. The method of claim 1 wherein the configured maximum WTRU output power for the overlaping portion is determined as a function of configured maximum WTRU output powers for two consecutive overlapping subframes.

4. The method of claim 1 wherein the configured maximum WTRU output power for the overlapping portion is same as one of configured maximum WTRU output powers for the two consecutive overlapping subframes.

5. The method of claim 1 wherein the configured maximum WTRU output power for the overlapping portion is selected by the WTRU from a range of a lower limit and a higher limit.

6. The method of claim 1 wherein the WTRU drops a sounding reference signal (SRS) on a condition that another physical channel is scheduled to be transmitted on a symbol that overlaps either partially or fully to the SRS on any component carrier.

7. The method of claim 1 further comprising:
 the WTRU calculating a transmit power for each sounding reference signal (SRS) to be transmitted on component carriers, wherein the WTRU drops the SRS on a condition that a sum of the transmit power for the SRS on multiple component carriers is to exceed an available power.

8. The method of claim 1 further comprising:
 the WTRU sending a power headroom report to a network, wherein the power headroom report includes a configured maximum WTRU output power for a present subframe on a condition that the configured maximum WTRU output power does not equal to a configured maximum WTRU output power for any serving cell or a sum of configured maximum WTRU output power for serving cells.

9. The method of claim 1 further comprising:
 the WTRU calculating a transmit power for a physical random access channel (PRACH); and
 the WTRU transmitting the PRACH, wherein a transmit power for the PRACH is constant over an entire PRACH preamble at a power level determined for a first subframe of the PRACH.

10. The method of claim 1 wherein a guard symbol is included in a component carrier to avoid overlapping channels.

11. A wireless transmit/receive unit (WTRU) for power control for wireless transmissions on multiple component carriers associated with multiple timing advances, the WTRU comprising:
 a processor configured to calculate a transmit power of physical channels in each subframe to be transmitted on a plurality of component carriers that belong to at least two different timing advance groups (TAGs), wherein each TAG is associated with a separate timing advance value for uplink transmissions;
 the processor is further configured to scale a transmit power of at least one of the physical channels in each subframe on a condition that a sum of a transmit power of the physical channels in the same subframe is to exceed a configured maximum WTRU output power for that subframe; and
 the processor is further configured to adjust a transmit power of at least one of the physical channels on a condition that a sum of a transmit power of the physical channels in an overlapping portion of a subframe of a less advanced TAG and a following consecutive subframe of a more advanced TAG is to exceed a configured maximum WTRU output power for the overlapping portion such that a sum of a transmit power of the physical channels in the overlapping portion does not exceed the configured maximum WTRU output power for the overlapping portion.

12. The WTRU of claim 11 wherein the processor is configured to adjust the transmit power of the physical channels in an order based on a physical channel priority.

13. The WTRU of claim 11 wherein the processor is configured to determine the configured maximum WTRU output power for the overlapping portion as a function of configured maximum WTRU output powers for two consecutive subframes.

14. The WTRU of claim 11 wherein the configured maximum WTRU output power for the overlapping portion is same as one of configured maximum WTRU output powers for the two consecutive overlapping subframes.

15. The WTRU of claim 11 wherein the processor is configured to select the configured maximum WTRU output power for the overlapping portion from a range of a lower limit and a higher limit.

16. The WTRU of claim 11 wherein the processor is configured to drop a sounding reference signal (SRS) on a condition that another physical channel is scheduled to be transmitted on a symbol that overlaps either partially or fully to the SRS on any component carrier.

17. The WTRU of claim 11 wherein the processor is configured to calculate a transmit power for each sounding reference signal (SRS) to be transmitted on component carriers, and drop the SRS on a condition that a sum of the transmit power for the SRS on multiple component carriers is to exceed an available power.

18. The WTRU of claim 11 wherein the processor is configured to send a power headroom report to a network including a configured maximum WTRU output power for a present subframe on a condition that the configured maximum WTRU output power does not equal to a configured maximum WTRU output power for any serving cell or a sum of configured maximum WTRU output power for serving cells.

19. The WTRU of claim 11 wherein the processor is configured to calculate a transmit power for a physical random access channel (PRACH), and transmit the PRACH, wherein a transmit power for the PRACH is constant over an entire PRACH preamble at a power level determined for a first subframe of the PRACH.

20. The WTRU of claim 11 wherein a guard symbol is included in a component carrier to avoid overlapping channels.

* * * * *